US006882125B2

(12) United States Patent
Kameda et al.

(10) Patent No.: US 6,882,125 B2
(45) Date of Patent: Apr. 19, 2005

(54) MOTOR CONTROLLER WITH POSITION DETECTOR

(75) Inventors: Koji Kameda, Osaka (JP); Hirokazu Yamasaki, Osaka (JP); Hiromi Tanoue, Nara (JP); Taro Kishibe, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 15 days.

(21) Appl. No.: 10/398,848

(22) PCT Filed: Oct. 10, 2001

(86) PCT No.: PCT/JP01/08906

§ 371 (c)(1),
(2), (4) Date: Sep. 30, 2003

(87) PCT Pub. No.: WO02/31957

PCT Pub. Date: Apr. 18, 2002

(65) Prior Publication Data

US 2004/0051499 A1 Mar. 18, 2004

(30) Foreign Application Priority Data

Oct. 12, 2000 (JP) ....................................... 2000-311592
Oct. 20, 2000 (JP) ....................................... 2000-320612
Apr. 13, 2001 (JP) ....................................... 2001-115033
Apr. 27, 2001 (JP) ....................................... 2001-131442

(51) Int. Cl.[7] ................................................ G05B 13/00
(52) U.S. Cl. .................. 318/561; 318/560; 318/568.11; 318/568.12; 323/305; 323/247; 323/301; 340/310.01; 340/310.07
(58) Field of Search ................................ 318/560, 561, 318/568.11, 568.12; 323/305, 247, 301; 340/310.01, 310.07

(56) References Cited

U.S. PATENT DOCUMENTS 4,689,605 A * 8/1987 Laue .......................... 340/333
4,734,919 A 3/1988 Tae ................................ 375/7
4,788,527 A * 11/1988 Johansson .............. 340/310.02
4,951,312 A 8/1990 Tanikawa et al. ........... 379/394
5,210,519 A 5/1993 Moore ......................... 340/310
5,289,524 A 2/1994 Takano et al. ................ 379/57
5,424,709 A * 6/1995 Tal ........................ 340/310.01
5,694,109 A * 12/1997 Nguyen et al. ......... 340/310.02
5,986,539 A * 11/1999 Johansson et al. ..... 340/310.01
6,072,585 A * 6/2000 Dutton et al. .............. 358/1.12

FOREIGN PATENT DOCUMENTS

GB 0360543 * 3/1990 ............ H02J/13/00
JP 53-100421 9/1978
JP 8-204571 8/1996
JP 10-91243 4/1998

* cited by examiner

*Primary Examiner*—Rita Leykin
(74) *Attorney, Agent, or Firm*—RatnerPrestia

(57) ABSTRACT

A motor controller includes a motor-position detector, a motor driver and a power cable having a pair of electric lines (two lines) which feeds power from the driver to the detector. The detector superimposes serial information about the motor-position to the power cable via windings of a transformer or a coupling capacitor. The serial information is obtained by converting parallel information about the motor-position. The serial information superimposed travels to the driver via the power cable. The driver receives the serial information via windings of the transformer or a coupling capacitor, and converts it to parallel information. The driver drives the motor according to this parallel information. The information necessary for driving the motor is superimposed to the power cable and transmitted through the power cable, so that a number of electric lines between the detector and the driver can be minimized.

51 Claims, 25 Drawing Sheets

MOTOR CONTROLLER WITH POSITION DETECTOR

THIS APPLICATION IS A U.S. NATIONAL PHASE APPLICATION OF PCT INTERNATIONAL APPLICATION PCT/JP01/08906.

TECHNICAL FIELD

The present invention relates to a controller of a servo-motor employed in a robot for industrial use, and more particularly, it relates to communicating the motor-position information between a position detector of the motor and a motor driver.

BACKGROUND ART

A motor controller is roughly divided into two sections: one is a motor position detector for detecting a rotating position of the motor hereinafter referred to as "motor-position"), and the other is a motor driver. FIG. 24 shows a structure of conventional motor position detector 100 and its connection to motor driver 120. Power supplying circuit 121 disposed in motor driver 120 supplies a power line voltage to power receiving circuit 101 disposed in motor position detector 100 via power cable 118 comprising a pair of electric lines. Power receiving circuit 101 powers respective circuits disposed in motor position detector 100 via lines (not shown). Position detecting circuit 102 coupled to motor 90 detects a motor position, and outputs the parallel information about the motor position. Encoding circuit 103 converts the parallel information into serial information. Motor-position-transmitting circuit 104 outputs the serial information about the motor position in a differential manner to signal cable 119 comprising a pair of lines. Motor position receiving circuit 122 disposed in motor driver 120 receives this serial information about the motor position via signal cable 119. Decoding circuit 123 converts the serial information about the motor position into parallel information. Motor driving circuit 140 drives the motor based on the parallel information thus obtained.

FIG. 25 shows an entire structure of a conventional motor controller, and illustrates details of motor driving circuit 140—surrounded by a bold line—disposed in motor driver 120. Three functions are built in motor-driving circuit 140, namely, a position instructing function, a speed instructing function and a torque instructing function.

When the position instructing function is activated, position control circuit 124 controls a position with motor position information θ and outer position instruction s1, then outputs inner speed instruction s4. Speed control circuit 126 controls a speed with speed information θ' and inner speed instruction s4. Speed information θ' is obtained by differentiating motor-position information θ in differentiating circuit 125. Circuit 126 then outputs inner torque instruction s5. Current detecting circuit 127 detects motor current information s6. Torque control circuit 128 supplies a command to gate drive circuit 129 based on inner torque instruction s5 and motor position information θ, thereby controlling motor current running through power circuit 130.

When the speed instructing function is activated, a speed is controlled by speed control circuit 126 using speed information θ' and outer speed instruction s2, and this control does not need position control circuit 124.

When the torque instructing function is activated, torque control circuit 128 controls motor current based on outer torque instruction s3 and motor position information θ. This control does not need both of position control circuit 124 and speed control circuit 126.

In the conventional motor controller discussed above, a power cable having one pair of lines (i.e., two lines) and a signal cable having one pair of lines (i.e., two lines) couple the motor position detector to the motor driver. In total two pairs of lines (i.e., four lines) are used. The present invention aims to provide a motor controller in which a motor position detector is coupled to a motor driver with only one pair of lines (i.e., two lines).

DISCLOSURE OF INVENTION

The motor controller of the present invention comprises the following elements:

- a motor position detector;
- a motor driver; and
- a power cable having a pair of lines for powering the motor position detector from the motor driver.

The motor position detector superimposes serial information—converted from parallel information about a motor position—onto the power cable via a signal coupling circuit of AC coupling such as windings on a transformer or a coupling capacitor. The serial information superimposed travels to the motor driver via the power cable. The motor driver receives the serial information via a signal coupling circuit of AC coupling such as windings on a transformer or a coupling capacitor, and converts it to parallel information about driving the motor. The motor position information is superimposed onto the power cable, thereby minimizing a number of coupling lines to two lines between the motor position detector and the motor driver.

BEST MODE FOR CARRYING OUT THE INVENTION

Exemplary embodiments of the present invention are demonstrated hereinafter with reference to the accompanying drawings.

(First Exemplary Embodiment)

Figure 1:
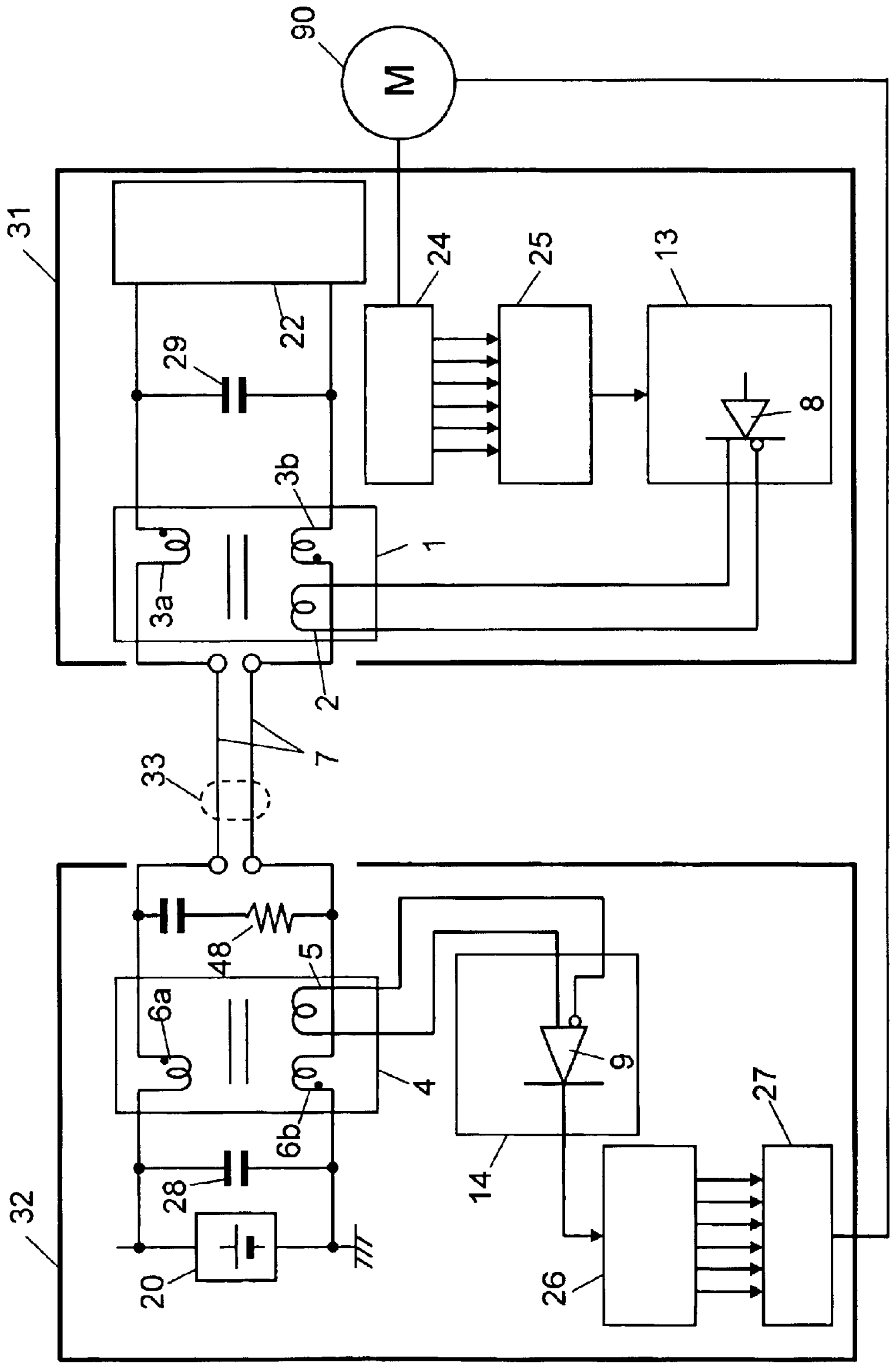
FIG. 1 shows a motor controller of balanced transmission type in accordance with a first exemplary embodiment of the present invention.

FIG. 1 shows a motor controller in accordance with the first embodiment of the present invention. Power cable 33 having a pair of lines 7—7 feeds power to motor position detector 31 from motor driver 32.

In detector 31, transformer 1 on the detector side has signal winding 2 and two power windings 3*a* and 3*b*. Two power windings 3*a*, 3*b* couple power cable 33 to power receiving circuit 22, thereby forming a power receiving path. In motor driver 32, transformer 4 has signal winding 5 and two power windings 6*a* and 6*b*. Two power windings 6*a* and 6*b* couple power cable 33 to power supplying circuit 20, thereby forming a power supply path. Circuit 20, as a control power supply on the driver side, powers respective control circuits in driver 32 via feeding lines (not shown).

Transformers 1 and 4 are formed of E-type ferrite cores of approx. 10 square mm and surface-mounted type (SMD) bobbins so that transformer 1 is mounted to a circuit board in the detector, and transformer 4 is mounted to a circuit board in the driver. The bobbins are wound with three electric lines in several turns or more than ten turns. One of the three electric lines carries a signal, and the other two lines are for the power supply. The signal winding needs substantially large inductance enough to transmit a longest pulse among the signals to be transmitted. In order to boost the inductance of the signal winding, the signal winding can have a greater number of turns than the other two lines. In this embodiment, the signal winding has 16 turns while the power supply windings have 8 turns. For instance, when Manchester code of 5 Mbps transmission rate is used, inductance of approx. 40 $\mu$H is reserved for practical use. Power supplying circuit 20 of motor driver 32 supplies, e.g., DC 5V–0V as a control power supply to power receiving circuit 22 via power supply windings 6*a*, 6*b* of transformer 4, power cable 33 and power windings 3*a*, 3*b* of transformer 1. Power receiving circuit 22 feeds the supplied DC voltage to respective control circuits in motor position detector 31 via feeding lines (not shown).

In motor position detector 31, position detecting circuit 24 outputs the following six signals constituting the positional information of motor 90 in parallel: phase A signal, phase B signal, phase Z signal, and three communication sensor (CS) signals. Encoding circuit 25 converts the parallel information about the motor position into serial information, i.e., the six signals discussed above at a certain interval are converted into one serial information so that the information can be sent through a pair of lines. Motor position transmitting circuit 13 outputs the serial information of the motor position to signal winding 2 of transformer 1 in a differential manner using line driver 8. In this embodiment, an interface IC available in the market is used as line driver 8. The motor position information supplied at signal winding 2 is transmitted to power windings 3*a* and 3*b* by transformer-operation, and is superimposed to a power voltage, then travels to power windings 6*a*, 6*b* of transformer 4 via power cable 33.

In motor driver 32, motor-position-receiving circuit 14 including line receiver 9 receives the motor position information via signal winding 5 of transformer 4 on the driver side. Decoding circuit 26 converts the motor position information in a serial form into a parallel form. Motor driving circuit 27 drives the motor based on the parallel information thus obtained about the motor position.

In this embodiment, an interface IC available in the market is used as line receiver 9 which processes the input in the differential manner. Capacitor 29 having 10–100 $\mu$F is connected between lines in the power receiving path between power receiving circuit 22 of motor position detector 31 and transformer 1 on the detector side in order to prevent noises from invading circuit 22. Capacitor 28 having 10–100 $\mu$F is connected between lines in the power supply path between power supplying circuit 20 of motor driver 32 and transformer 4 on the driver side in order to prevent noises from invading circuit 20. Terminator resistor 48—having the same resisting value as a characteristic impedance of power cable 33—is connected between lines in the power supply path between power cable 33 and transformer 4 on the driver side in order to prevent a signal from reflecting between transmission lines. The reflection troubles the signal transmission at a high speed and a high frequency. In this embodiment, terminator resistor 48 has 100 ohm the same value as the impedance of power cable 33. In this case, since a DC voltage is used in the power supply, a capacitor is coupled in series to resistor 48, so that the effect is produced only in AC components of the signal. When the capacitor is not used, the resistor generates heat, and the transmission waveform is sometimes distorted.

A twisted-pair line or a shielded twisted-pair line used for power cable 33 is effective to remove incoming noises and withstand common-mode noises.

The motor controller used in this embodiment shown in FIG. 1 comprises the following elements:

transformer 1, disposed on the detector side, including one signal winding 2 and two power windings 3*a* and 3*b*; and transformer 4, disposed on the driver side, including one signal winding 5 and two power windings 6*a* and 6*b*.

Figure 2:
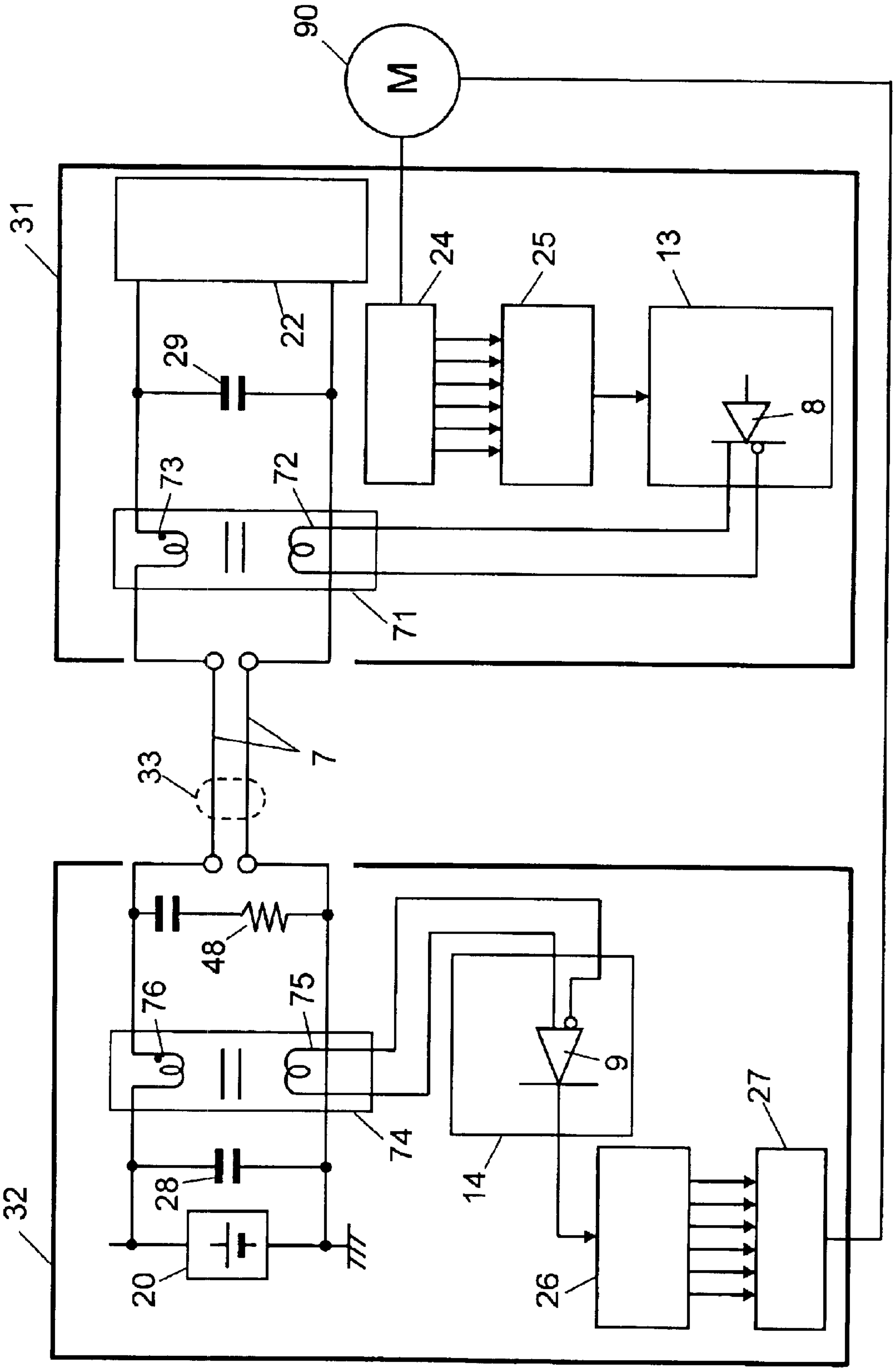
FIG. 2 shows a motor controller of non-balanced transmission type in accordance with the first exemplary embodiment of the present invention.

The motor controller transmits a signal through a balanced transmission method. If a motor controller is placed in satisfactory environment, the controller can transmit a signal through a non-balanced transmission method. FIG. 2 shows a structure of the non-balanced transmission method. In FIG. 2, elements similar to those in this embodiment have the same reference marks, and the descriptions thereof are omitted. The motor controller shown in FIG. 2 comprises the following elements:

transformer 71, disposed on the detector side, having one signal winding 72 and one power winding 73; and transformer 74, disposed on the driver side, having one signal winding 75 and one power winding 76.

The motor controller transmits a signal through the non-balanced transmission method. The structure illustrated in FIG. 2 is smaller and less expensive than that shown in FIG. 1.

(Second Exemplary Embodiment)

Figure 3:
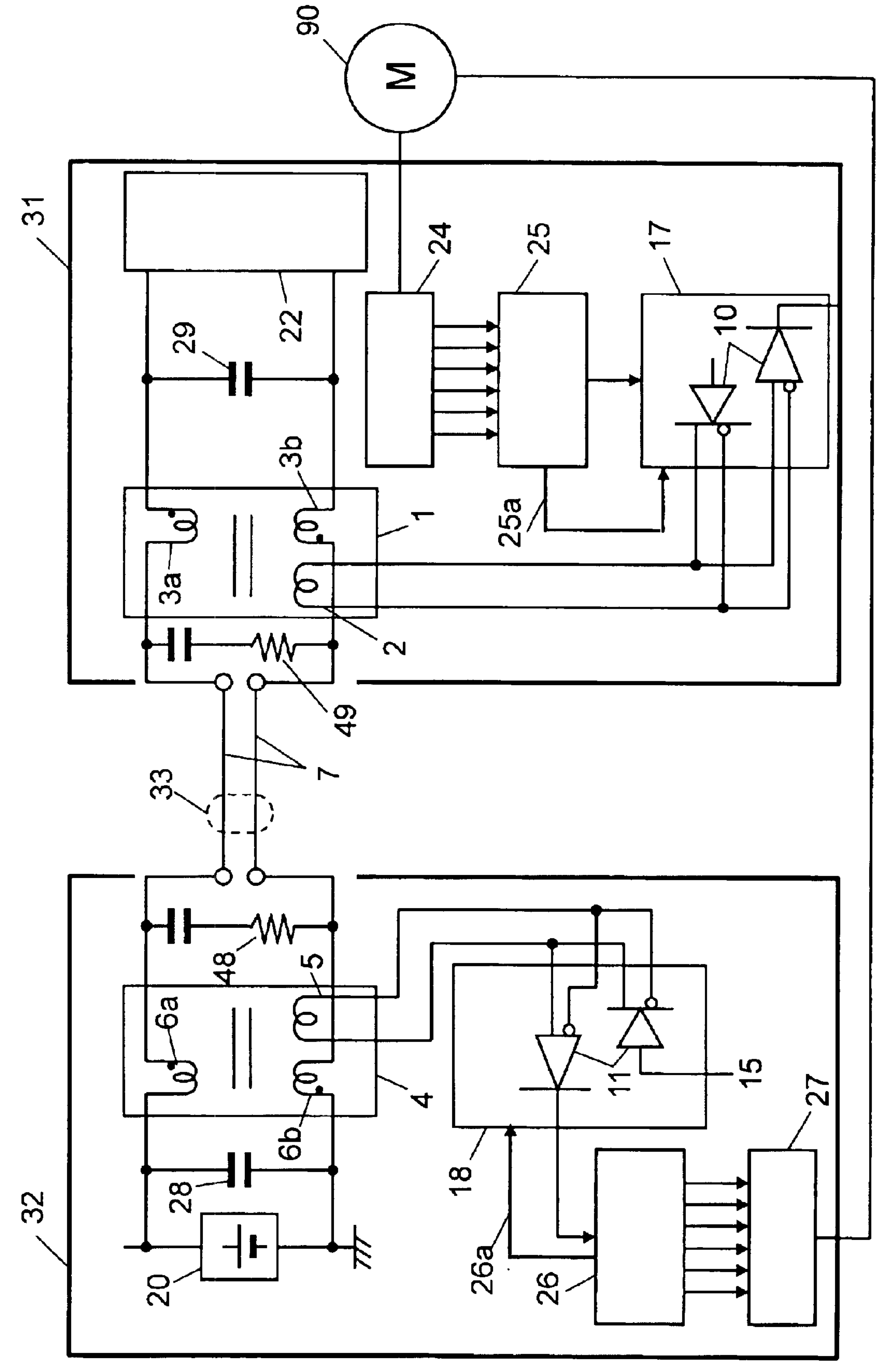
FIG. 3 shows a motor controller in accordance with a second exemplary embodiment.

FIG. 3 illustrates the second embodiment of the present invention. The second embodiment includes new elements in addition to the elements of the first embodiment. Elements similar to those of the first embodiment have the same reference marks, and the descriptions thereof are thus omitted here. The motor controller in accordance with the second embodiment can communicate information between decoding circuit 26 of motor driver 32 and encoding circuit 25 of motor position detector 31 in both ways.

Motor driver 32 employs transmitting/receiving circuit 18 including transceiver 11 which has both the functions of transmitting and receiving, so that driver 32 is equipped with both of a motor-position-receiving circuit and the control-signal-transmitting circuit. Circuit 18 stays in a reception mode regularly; however, it is turned to a transmission mode by transmission-mode signal 26*a* supplied from decoding circuit 26. Decoding circuit 26 supplies transmission-mode signal 26*a* in transmitting, thereby turning circuit 18 into the transmission mode, and circuit 26 deletes signal 26*a* when signal transmission ends, thereby restoring circuit 18 to the reception mode.

Motor position detector 31 employs transmitting/receiving circuit 17 including transceiver 17, thereby having both of the motor-position-transmitting circuit and the control-signal-receiving circuit. Circuit 17 stays in the reception mode regularly; however, it is turned to the transmission mode by transmission-mode signal 25*a* supplied from encoding circuit 25. Encoding circuit 25 supplies transmission-mode signal 25*a* in transmitting, thereby turning circuit 17 into the transmission mode. Circuit 25 deletes transmission-mode signal 25*a* when the signal transmission ends, thereby restoring circuit 17 to the reception mode.

Transceivers 10 and 11 input and output signals in two ways in a differential manner, and employ interface ICs available in the market. Terminator resistor 49—having the same resisting value as a characteristic impedance of power cable 33—is connected between lines in the power receiving path between power cable 33 and transformer 1 on the detector side in order to prevent a signal from reflecting. The motor controller in accordance with this embodiment can communicate various information between motor driver 32 and motor-position detector 31. The various information includes the information about the motor-position, the information about the operating status of the detector, the information proper to the motor, parameters for controlling, and so on.

The positional information of the motor is transmitted, for instance, in the following sequence:

1. In accordance with a control-timing produced by a timer (not shown), decoding circuit 26 outputs transmission-mode signal 26*a*, thereby turning transmitting/receiving circuit 18 to the transmission mode, then outputs detector-controlling signal 15—requesting motor-position information—to circuit 18.
2. Transmitting/receiving circuit 18 transmits detector-controlling signal 15 to signal winding 5 of transformer 4 on the driver side. Decoding circuit 26 deletes transmission-mode signal 26*a* when the signal transmission ends, and circuit 18 is restored to the reception mode.
3. Detector-controlling signal 15 travels to transmitting/receiving circuit 17 via signal winding 5 of transformer 4 on the driver side, power windings 6*a* and 6*b*, power cable 33, power winding 3 of transformer 1 on the detector side, and signal winding 2. Circuit 17 transmits received controlling signal 15 to encoding circuit 25.
4. Encoding circuit 25 outputs transmission-mode signal 25*a*, thereby turning circuit 17 to the transmission mode, then outputs the serial positional information about the motor at that moment to circuit 17.
5. Transmitting/receiving circuit 17 transmits the serial positional information about the motor to signal winding 2, and encoding circuit 25 deletes transmission-mode signal 25*a* when the signal transmission ends. Then circuit 17 is restored to the reception mode.
6. The serial positional information about the motor travels to transmitting/receiving circuit 18 via signal winding 2 of transformer 1 on the detector side, power windings 3*a* and 3*b*, power cable 33, power windings 6*a* and 6*b* of transformer 4 on the driver side, and signal winding 5. Circuit 18 transmits the received information to decoding circuit 26.
7. Decoding circuit 26 converts the serial positional information about the motor into parallel data, and outputs the data to motor-driving circuit 27.
8. Motor-driving circuit 27 controls the motor based on the positional information about the motor thus obtained.

(Third Exemplary Embodiment)

Figure 4:
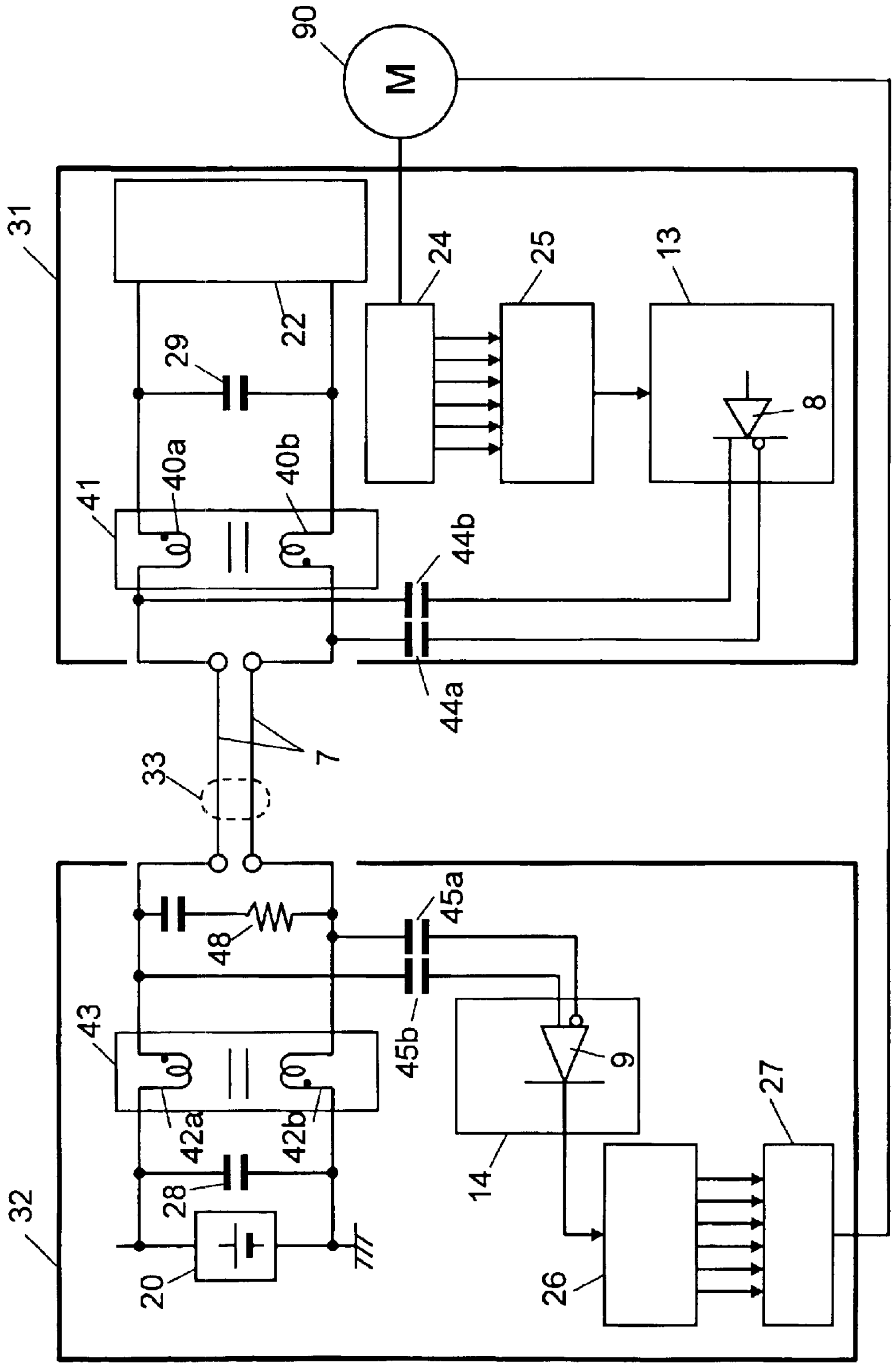
FIG. 4 shows a motor controller of a balanced transmission type of motor in accordance with a third exemplary embodiment of the present invention.

FIG. 4 illustrates the third embodiment of the motor controller of the present invention. Elements similar to those of the previous embodiments have the same reference marks, and the descriptions thereof are thus omitted here. Power cable 33 having a pair of lines 7—7 (two lines) feeds power to motor-position detector 31 from motor driver 32.

In detector 31, two windings 40*a* and 40*b* of choke coil 41 on the detector side couple power cable 33 to power receiving circuit 22 respectively, thereby forming a power receiving path. Coupling capacitors 44*a* and 44*b*—used for signal transmission—on the detector side, couple each one of their ends respectively between power cable 33 and choke coil 41 on the detector side. Coupling capacitors 44*a* and 44*b* have large capacity enough to transmit a pulse of the maximum length among the signals transmitted. Choke coil 41 has large inductance enough to insulate a transmitted signal from power receiving circuit 22 in an AC manner. In driver 32, two windings 42*a* and 42*b* of choke coil 43 on the driver side couple power-supplying circuit 20 to power cable 33 respectively, thereby forming a power supplying path. Circuit 20, as a control power supply on the driver side, powers respective control circuits in driver 32 via feeding lines (not shown). Two coupling capacitors 45*a* and 45*b*—used for signal transmission—on the driver side couple each one of their ends between power cable 33 and choke coil 43 on the driver side. Coupling capacitors 45*a* and 45*b* have large capacity enough to transmit the maximum length of pulse among the signals transmitted. Choke coil 43 has large inductance enough to insulate a transmitted signal from power supplying circuit 20 in an AC manner. Circuit 20 of driver 32 supplies, e.g., DC 5V–0V as a control power supply, to power-receiving circuit 22 via choke coil 43, power cable 33, and choke coil 41 on the detector side. Circuit 22 powers the supplied DC voltage to respective control circuits in detector 31 via feeding lines not shown.

In motor position detector 31, position-detecting circuit 24 outputs a phase A signal, a phase B signal, a phase Z signal and three CS signals, i.e., six signals in total, constituting the positional information of motor 90, in parallel. Encoding circuit 25 converts the parallel signals into a serial signal. In other words, the six signals at a certain interval are collected into serial information so that the information can be sent via a pair of lines. Transmitting circuit 13 for motor-position outputs the serial positional information of the motor in a differential manner to coupling-capacitors 44*a* and 44*b* using line driver 8. In this embodiment, an interface IC available in the market is used as line driver 8. The positional information of the motor supplied to coupling capacitors 44*a* and 44*b* is prevented from traveling to power-receiving circuit 22 by choke coil 41 on the detector side, and super-imposed on the power cable by electrostatic induction. The positional information of the motor arrived at driver 32 via the power cable is prevented from traveling to power-supplying circuit 20 by choke coil 43 on the driver side. Motor-position-receiving circuit 14 having line receiver 9 receives the positional information of the motor via coupling capacitors 45*a* and 45*b* on the driver side. Decoding circuit 26 converts the serial information of the motor position into the parallel information. Motor driving circuit 27 drives the motor based on the parallel information thus obtained about the motor position. In this embodiment, an interface IC available in the market is used as line receiver 9 carrying out the differential input. In order to prevent noises from invading power-receiving circuit 22, capacitor 29 having 10–100 $\mu$F is connected between lines in the power receiving path between choke coil 41 on the detector side and power-receiving circuit 22. In order to prevent noises from invading power-supplying circuit 20, capacitor 28 having 10–100 $\mu$F is connected between lines in the power supply path between choke coil 43 on the driver side and power-supplying circuit 20. Terminator resistor 48—having the same resisting value as a characteristic impedance of power cable 33—is connected between lines in the power supply path between power cable 33 and choke coil 43 on the driver side in order to prevent a signal from reflecting between transmission lines. The reflection troubles the signal transmission at a high speed and a high frequency. In this embodiment, terminator resistor 48 has 100 ohm the same value as the impedance of power cable 33. In this case, since a DC voltage is used in the power supply, a capacitor is coupled in series to resistor 48, so that the effect is produced only in AC components of the signal. When the capacitor is not used, the resistor generates heat, and the transmission waveform is sometimes distorted. A twisted-pair line or a shielded twisted-pair line used for power cable 33 is effective to remove incoming noises and withstand common-mode noises. A ring-shaped ferrite core or a square split-type ferrite core can be used as an iron core of the choke coil.

The motor controller shown in FIG. 4 comprises the following elements:

- choke coil 41—disposed on the detector side—having two windings 40*a* and 40*b;*
- choke coil 43—disposed on the driver side—having two windings 42*a* and 42*b;*
- two coupling capacitors 44*a* and 44*b* disposed on the detector side; and
- two coupling capacitors 45*a* and 45*b* disposed on the driver side.

Figure 5:
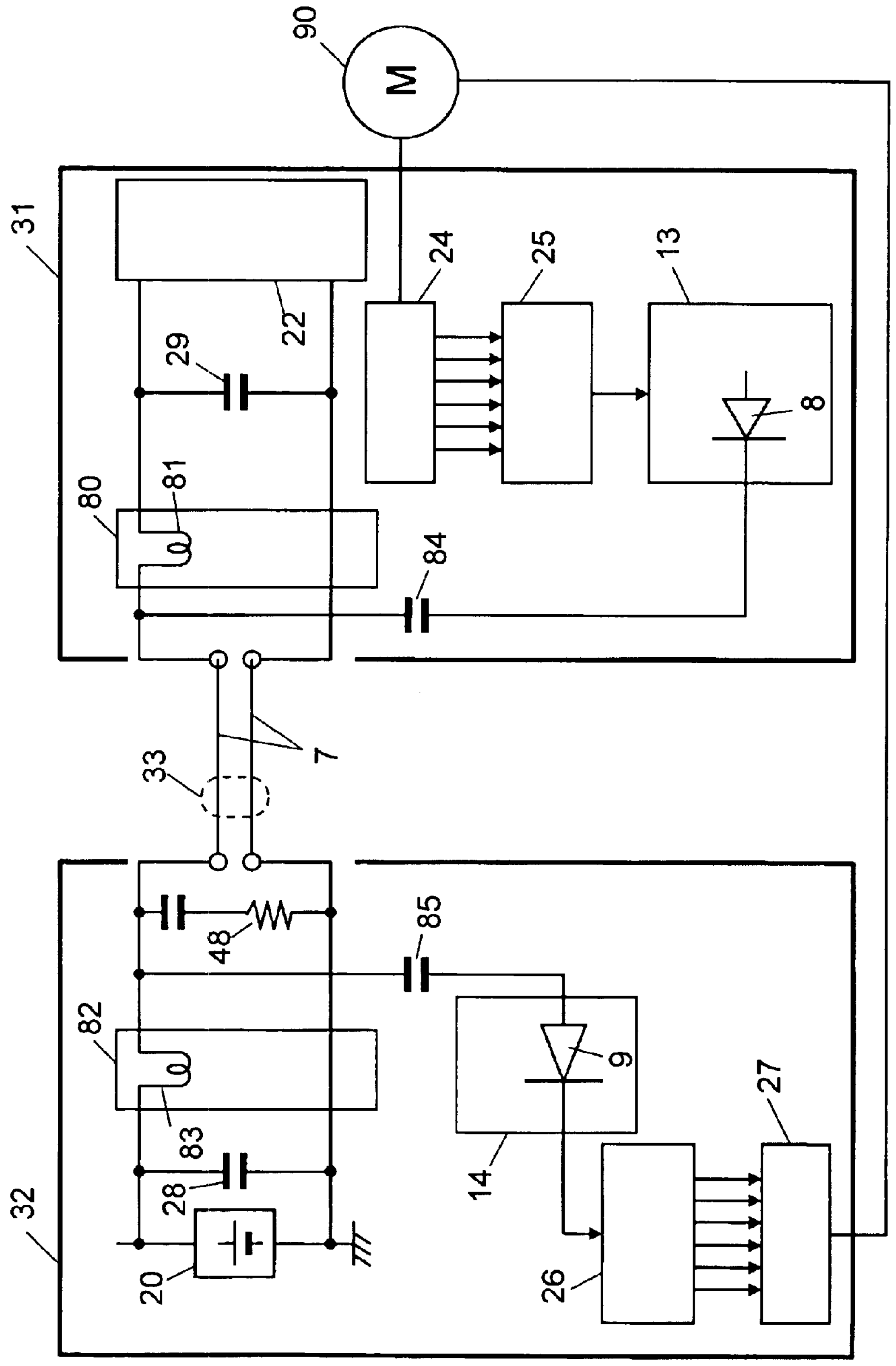
FIG. 5 shows a motor controller of a non-balanced transmission type of motor in accordance with the third exemplary embodiment of the present invention.

The motor controller transmits signals through the balanced transmission method. If the motor controller is placed in an excellent environment, signals can be transmitted through non-balanced method, which is shown in FIG. 5. In FIG. 5, elements similar to those of the previous embodiments have the same reference marks and the descriptions thereof are omitted here. The motor controller shown in FIG. 5 comprises the following elements:

- choke coil 80—disposed on the detector side—having one winding 81;
- choke coil 82—disposed on the driver side—having one winding 83;
- coupling capacitor 84 disposed on the detector side;
- coupling capacitor 85 disposed on the driver side;
- motor-position-transmitting circuit 13 having signal outputting element 8; and
- motor-position-receiving circuit 14 having signal receiving element 9.

The motor controller transmits signals through the non-balanced method. The structure shown in FIG. 5 is smaller and less expensive than that shown in FIG. 4.

(Fourth Exemplary Embodiment)

Figure 6:
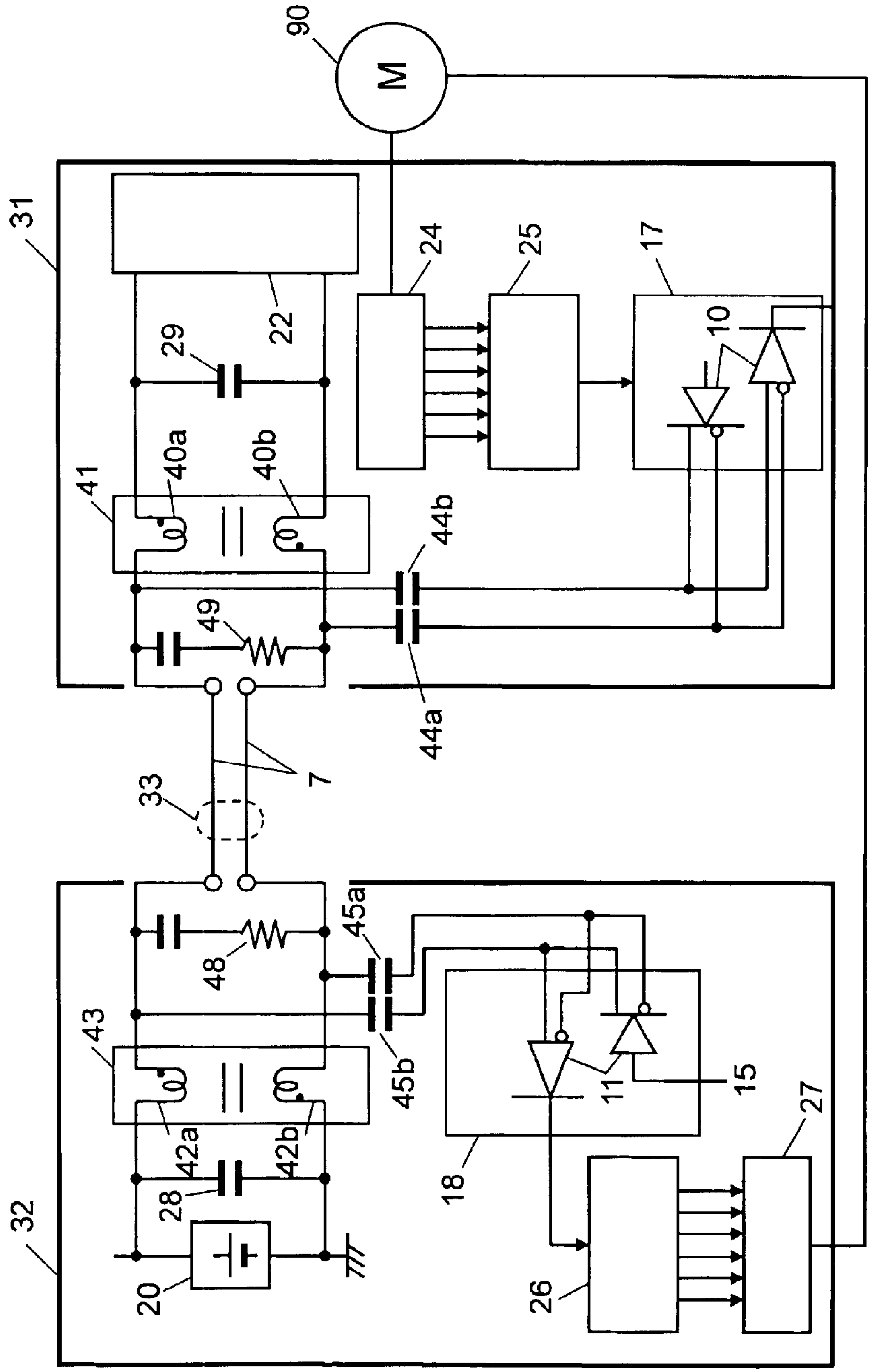
FIG. 6 shows a motor controller in accordance with a fourth exemplary embodiment of the present invention.

FIG. 6 illustrates the motor controller in accordance with the fourth embodiment of the present invention. In this embodiment, a new structure is added to the third embodiment shown in FIG. 4. Elements similar to those in the third embodiment have the same reference marks, and the descriptions thereof are thus omitted here. The motor controller in accordance with this fourth embodiment can communicate information, as same as the second embodiment, between motor driver 32 and motor-position detector 31 in both ways.

Motor driver 32 further includes a control-signal-transmitting circuit which transmits a detector-controlling signal—requesting the positional information about the motor—to detector 31. To be more specific, driver 32 employs transmitting/receiving circuit 18 having transceiver 11, so that driver 32 is equipped with both of a motor-position-receiving circuit and the control-signal-transmitting circuit.

Detector 31 further includes a control-signal-transmitting circuit. To be more specific, detector 31 employs transmitting/receiving circuit 17 having transceiver 10, so that detector 31 is equipped with both of a motor-position-transmitting circuit and the control-signal-receiving circuit.

Transceivers 10 and 11 input and output signals in two ways in a differential manner, and employ interface ICs available in the market. Terminator resistor 49—having the same resistor value as a characteristic impedance of power cable 33—is connected between lines in the power receiving path between power cable 33 and choke coil 41 on the detector side in order to prevent a signal from reflecting. The control-signal-transmitting circuit in transmitting/receiving circuit 18 outputs detector-controlling signal 15—requesting the positional information about the motor—to coupling capacitors 45*a* and 45*b* on the driver side. Signal 15 travels to the control-signal-receiving circuit in transmitting/receiving circuit 17 via power cable 33, coupling capacitors 44*a* and 44*b* on the detector side.

(Fifth Exemplary Embodiment)

Figure 7:
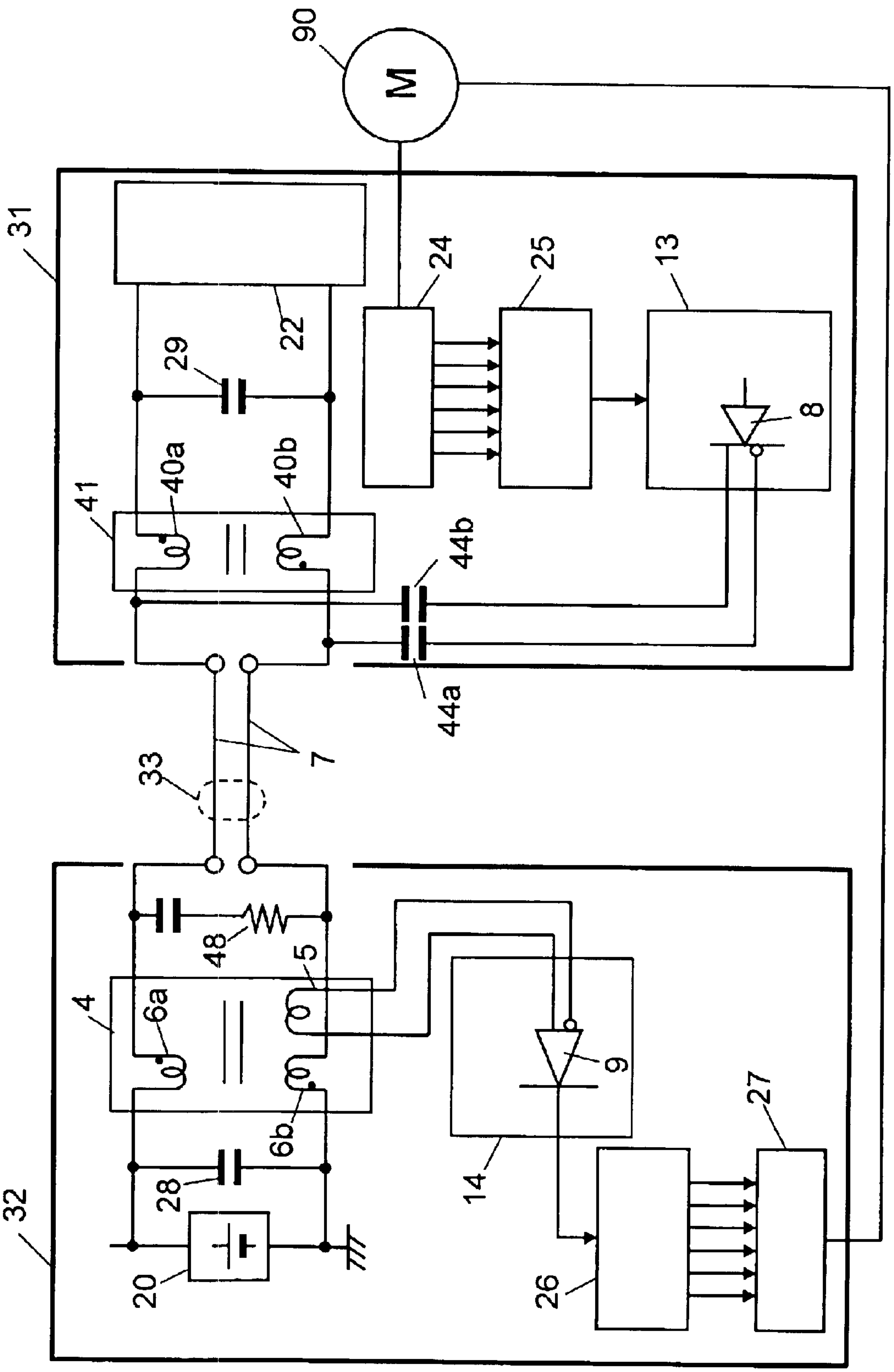
FIG. 7 shows a motor controller of a balanced transmission type of motor in accordance with a fifth exemplary embodiment of the present invention.

FIG. 7 illustrates the motor controller in accordance with the fifth embodiment of the present invention. Elements similar to those in the previous embodiments have the same reference marks, and the descriptions thereof are thus omitted here. Power cable 33 having a pair of lines 7—7 (two lines) feeds power to motor-position detector 31 from motor driver 32.

In detector 31, choke coil 41 on the detector side has two windings 40*a* and 40*b*. Two windings 40*a* and 40*b* couple power cable 33 to power-receiving circuit 22 respectively, thereby forming a power-receiving path. Two coupling capacitors 44*a* and 44*b*—used for signal transmission—on the detector side couple each one of their ends respectively between power cable 33 and choke coil 41. Coupling capacitors 44*a* and 44*b* have large capacity enough to transmit a pulse of the maximum length among the signals transmitted. Choke coil 41 has large inductance enough to insulate a transmitted signal against power-receiving circuit 22 in an AC manner.

In motor driver 32, transformer 4 on the driver side has signal winding 5 and two power windings 6*a* and 6*b*. Two power windings 6*a* and 6*b* couple power cable 33 to power supplying circuit 20 respectively, thereby forming a power-supplying path. Power supplying circuit 20, as a control power supply on the driver side, powers respective control circuits in driver 32 via feeding lines (not shown).

In order to be mounted on a circuit board on the driver side, transformer 4 employs a surface mounted device (SMD) formed of bobbins and an E-type split-ferrite-core of 10 mm square. The bobbins are wound with three electric lines in several turns. One of the three electric lines carries signals, and the other two lines are power cables 6*a* and 6*b*. Signal winding 5 needs substantially large inductance enough to transmit the longest pulse among the signals to be transmitted. In order to boost the inductance of signal winding 5, the signal winding can have a greater number of turns than the other two lines. In this embodiment, signal winding 5 has 16 turns while each of the power windings 6*a* and 6*b* has 8 turns. For instance, when Manchester code of 5 Mbps transmission rate is used, inductance of approx. 40 $\mu$H is reserved for regular operation.

Power supplying circuit 20 of motor driver 32 supplies, e.g., DC 5V–0V as a control power supply, to power receiving circuit 22 via power windings 6*a*, 6*b* of transformer 4 on the driver side, power cable 33 and choke coil 41 on the detector side. Power-receiving circuit 22 supplies the supplied DC voltage to respective control circuits in motor position detector 31 via feeding lines (not shown). In motor position detector 31, position detecting circuit 24 outputs the following six signals in parallel: a phase A signal, a phase B signal, a phase Z signal and three communication sensor (CS) signals. These six signals constitute the positional information of motor 90. Encoding circuit 25 converts the parallel signals of the motor position information into serial signals, i.e., the six signals discussed above at a certain interval are converted into one serial information so that the information can be sent through a pair of lines. Motor position transmitting circuit 13 outputs the serial information of the motor position to coupling capacitors 44*a* and 44*b* on the detector side in a differential manner using line driver 8. In this embodiment, an interface IC available in the market is used as line driver 8. The positional information of the motor supplied to coupling capacitors 44*a* and 44*b* is prevented from traveling to power-receiving circuit 22 by choke coil 41 on the detector side, and super-imposed on the power cable by electrostatic induction. The positional information then travels to power windings 6*a* and 6*b* of transformer 4 on the driver side. Motor-position-receiving circuit 14 having line receiver 9 receives the positional information of the motor via signal winding 5 of transformer 4 on the driver side. Decoding circuit 26 converts the serial information of the motor position into the parallel information. Motor driving circuit 27 drives the motor based on the parallel information about the motor position thus obtained. In this embodiment, an interface IC available in the market is used as line receiver 9 processing the differential input.

In order to prevent noises from invading power-receiving circuit 22, capacitor 29 having 10–100 $\mu$F is connected between lines in the power receiving path between choke coil 41 on the detector side and power-receiving circuit 22. In order to prevent noises from invading power-supplying circuit 20, capacitor 28 having 10–100 $\mu$F is connected between lines in the power supply path between transformer 4 on the driver side and power-supplying circuit 20. Terminator resistor 48—having the same resisting value as a characteristic impedance of power cable 33—is connected between lines in the power supply path between power cable 33 and transformer 4 on the driver side in order to prevent a signal from reflecting between transmission lines. The reflection troubles the signal transmission at a high speed and a high frequency. In this embodiment, terminator resistor 48 has 100 ohm the same value as the impedance of power cable 33. In this case, since a DC voltage is used in the power supply, a capacitor is coupled in series to resistor 48, so that the effect is produced only in AC components of the signal. When the capacitor is not used, the resistor generates heat, and the transmission waveform is sometimes distorted. A twisted-pair line or a shielded twisted-pair line used for power cable 33 is effective to remove incoming noises and withstand common-mode noises. A ring-shaped ferrite core or a square split-type ferrite core can be used as an iron core of the choke coil.

The motor controller shown in FIG. 7 comprises the following elements:

choke coil 41—disposed on the detector side—having two windings 40*a* and 40*b;* two coupling capacitors 44*a* and 44*b* disposed on the detector side; and transformer 4—disposed on the driver side—having one signal winding 5 and two power windings 6*a* and 6*b.*

Figure 8:
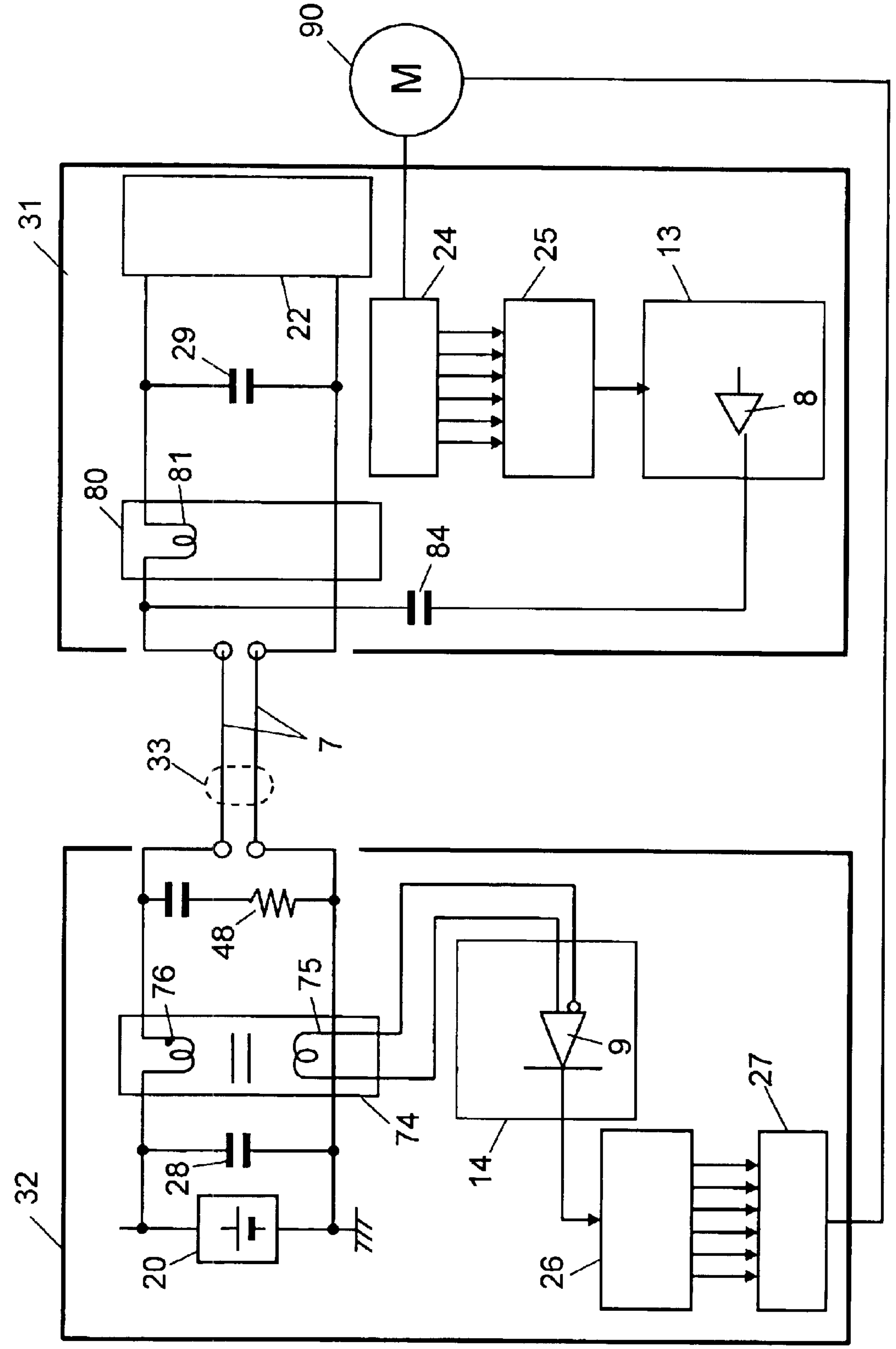
FIG. 8 shows a motor controller of a non-balanced transmission type of motor in accordance with the fifth exemplary embodiment of the present invention.

The motor controller transmits signals through a balanced transmission method. If the motor controller is placed in an excellent environment, signals can be transmitted through non-balanced method, which is shown in FIG. 8. In FIG. 8, elements similar to those of the previous embodiments have the same reference marks and the descriptions thereof are omitted here. The motor controller shown in FIG. 8 comprises the following elements:

choke coil 80—disposed on the detector side—having one winding 81;

one coupling capacitor 84 disposed on the detector side;

motor-position-transmitting circuit 13 having signal outputting element 8; and transformer 74 having one signal winding 75 and one power winding 76.

The motor controller transmits signals through the non-balanced method. The structure shown in FIG. 8 is smaller and less expensive than that shown in FIG. 7.

(Sixth Exemplary Embodiment)

Figure 9:
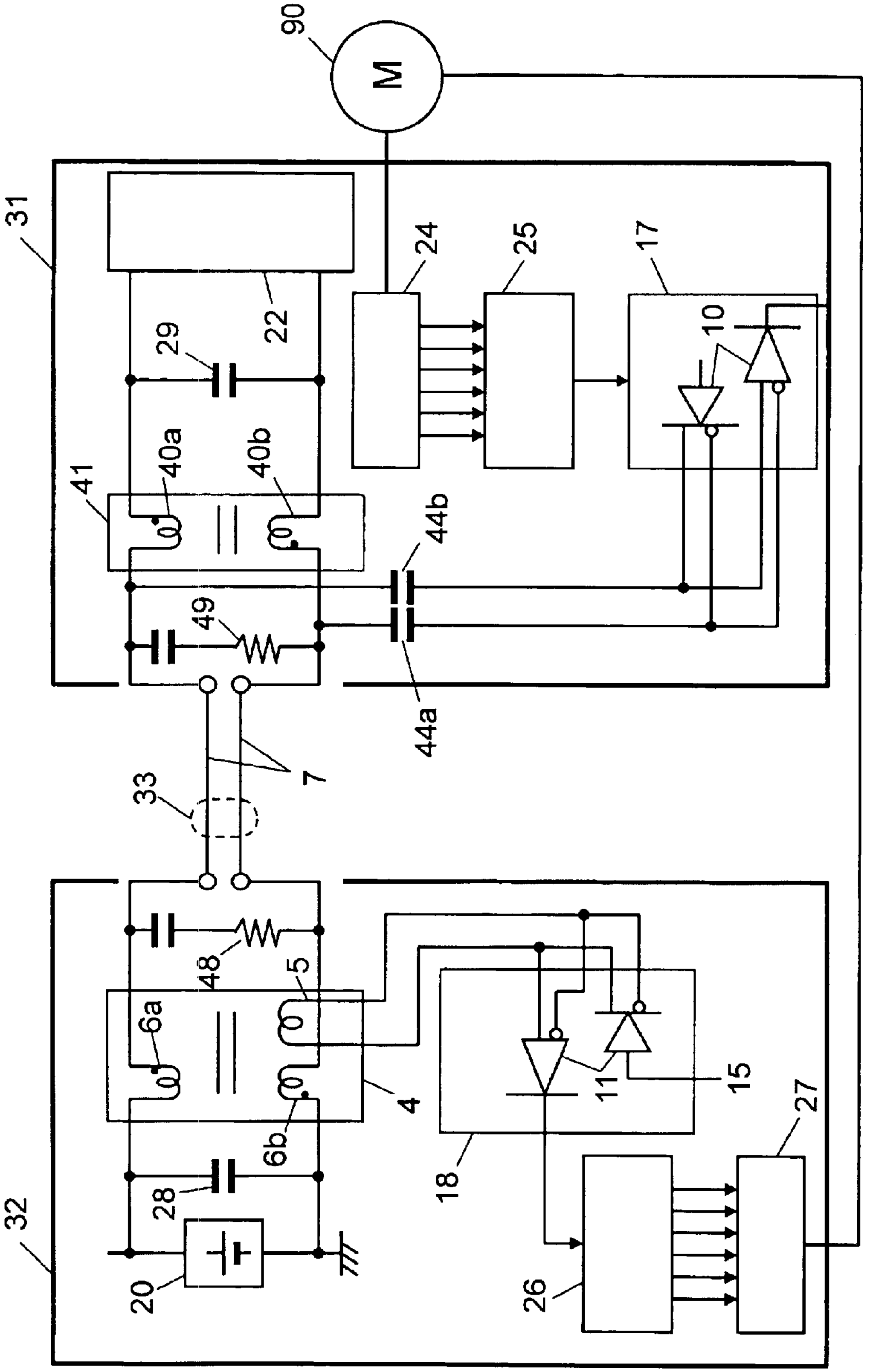
FIG. 9 shows a motor controller in accordance with a sixth exemplary embodiment of the present invention.

FIG. 9 illustrates the motor controller in accordance with the sixth embodiment of the present invention. In this embodiment, a new structure is added to the fifth embodiment shown in FIG. 7. Elements similar to those in the fifth embodiment have the same reference marks, and the descriptions thereof are thus omitted here. The motor controller in accordance with this sixth embodiment can communicate information, as same as the second embodiment, between motor driver 32 and motor-position detector 31 in both ways.

Motor driver 32 further includes a control-signal-transmitting circuit which transmits a detector-controlling signal—requesting the positional information about the motor—to detector 31. To be more specific, driver 32 employs transmitting/receiving circuit 18 having transceiver 11, so that driver 32 is equipped with both of a motor-position-receiving circuit and the control-signal-transmitting circuit.

Detector 31 further includes a control-signal-receiving circuit. To be more specific, detector 31 employs transmitting/receiving circuit 17 having transceiver 10, so that detector 31 is equipped with both of a motor-position-transmitting circuit and the control-signal-receiving circuit.

Transceivers 10 and 11 input and output signals in two ways in a differential manner, and employ interface ICs available in the market. Terminator resistor 49—having the same resistor value as a characteristic impedance of power cable 33—is connected between lines in the power receiving path between power cable 33 and choke coil 41 on the detector side in order to prevent a signal from reflecting. The control-signal-transmitting circuit in transmitting/receiving circuit 18 outputs detector-controlling signal 15—requesting the positional information about the motor—to signal winding 5 of transformer 4 on the driver side. Signal 15 travels to the control-signal-receiving circuit in transmitting/receiving circuit 17 via power cable 33, coupling capacitors 44*a* and 44*b* on the detector side.

(Seventh Exemplary Embodiment)

Figure 10:
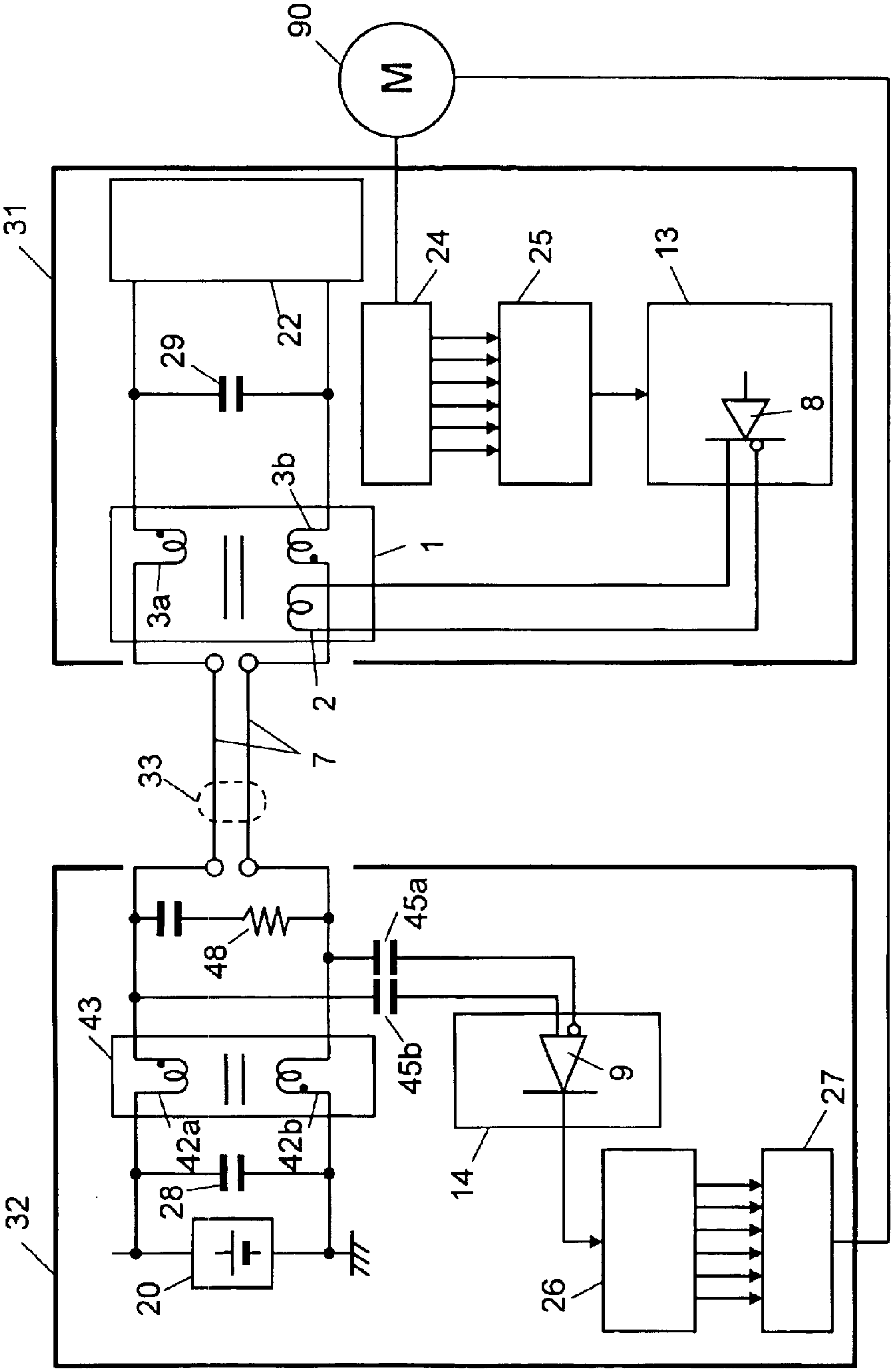
FIG. 10 shows a motor controller of a balanced transmission type of motor in accordance with a seventh exemplary embodiment of the present invention.

FIG. 10 shows a motor controller in accordance with the seventh embodiment of the present invention. Power cable 33 having a pair of lines 7—7 (two lines) feeds power to motor-position detector 31 from motor driver 32.

In detector 31, transformer 1 on the detector side has signal winding 2 and two power windings 3*a* and 3*b*. Two power windings 3*a* and 3*b* couple power cable 33 to power receiving circuit 22, thereby forming a power-receiving path.

In order to be mounted on a circuit board on the detector side, transformer 1 employs a surface mounted device (SMD) formed of bobbins and an E-type split-ferrite-core of 10 mm square. The bobbins are wound with three electric lines in several turns. One of the three electric lines carries signals, and the other two lines are power cables 3*a* and 3*b*. Signal winding 2 needs substantially large inductance enough to transmit the longest pulse among the signals to be transmitted. In order to boost the inductance of signal winding 2, the signal winding can have a greater number of turns than the other two lines. In this embodiment, signal winding 2 has 16 turns while each of the power windings 3*a* and 3*b* has 8 turns. For instance, when Manchester code of 5 Mbps transmission rate is used, inductance of approx. 40 $\mu$H is reserved for regular operation.

In motor driver 32, two windings 42*a* and 42*b* of choke coil 43 on the driver side couple power-cable 33 to power supplying circuit 20, thereby forming a power supplying path. Circuit 20, as a control power supply on the driver side, powers respective control circuits in driver 32 via feeding lines (not shown). Two coupling capacitors 45*a* and 45*b* for signal transmission couple each one of their ends between power cable 33 and choke coil 43 on the driver side. Coupling capacitors 45*a* and 45*b* have large capacity enough to transmit the maximum length of pulse among the signals transmitted. Choke coil 43 has large inductance enough to insulate a transmitted signal from power supplying circuit 20 in an AC manner.

Power supplying circuit 20 of motor driver 82 supplies, e.g., DC 5V–0V as a control power supply to power receiving circuit 22 via choke coil 43 on the driver side, power cable 33 and power windings 3*a*, 3*b* of transformer 1. Power receiving circuit 22 powers the supplied DC voltage to respective control circuits in motor-position detector 31 via feeding lines (not shown).

In motor position detector 31, position detecting circuit 24 outputs the following six signals in parallel: a phase A signal, a phase B signal, a phase Z signal and three communication sensor (CS) signals. These six signals constitute the positional information of motor 90. Encoding circuit 25 converts the parallel signals of the motor-position information into serial signals, i.e., the six signals discussed above at a certain interval are converted into one serial information so that the information can be sent through a pair of lines. Motor position transmitting circuit 13 outputs the serial information of the motor position to signal winding 2 of transformer 1 on the detector side in a differential manner using line driver 8. In this embodiment, an interface IC available in the market is used as line driver 8. The positional information of the motor supplied to signal winding 2 is conveyed to power windings 3*a* and 3*b* due to the operation of the transformer, and superimposed to the power voltage. The positional information then travels to driver 32 via power cable 33.

In motor driver 32, motor-position-receiving circuit 14 including line receiver 9 receives the motor-position information via coupling capacitors 45*a* and 45*b* on the driver side. Decoding circuit 26 converts the motor-position information in a parallel form into a serial form. Motor driving circuit 27 drives the motor based on the parallel information thus obtained about the motor position.

In this embodiment, an interface IC available in the market is used as line receiver 9 which processes the input in the differential manner. Capacitor 29 having 10–100 $\mu$F is connected between lines in the power receiving path between power receiving circuit 22 of motor position detector 31 and transformer 1 on the detector side in order to prevent noises from invading circuit 22. Capacitor 28 having 10–100 $\mu$F is connected between lines in the power supply path between power supplying circuit 20 of motor driver 32 and choke coil 43 on the driver side in order to prevent noises from invading circuit 20.

Terminator resistor 48—having the same resisting value as a characteristic impedance of power cable 33—is connected between lines in the power supply path between power cable 33 and choke coil 43 on the driver side in order to prevent a signal from reflecting between transmission lines. The reflection troubles the signal transmission at a high speed and a high frequency. In this embodiment, terminator resistor 48 has 100 ohm the same value as the impedance of power cable 33. In this case, since a DC voltage is used in the power supply, a capacitor is coupled in series to resistor 48, so that the effect is produced only in AC components of the signal. When the capacitor is not used, the resistor generates heat, and the transmission waveform is sometimes distorted.

A twisted-pair line or a shielded twisted-pair line used for power cable 33 is effective to remove incoming noises and withstand common-mode noises. A ring-shaped ferrite core or a square split-type ferrite core can be used as an iron core of the choke coil.

The motor controller shown in FIG. 10 comprises the following elements:

transformer 1—disposed on the detector side—having one signal winding and two power windings 3*a* and 3*b;* choke coil 43—disposed on the detector side—having two windings 42*a* and 42*b*; and two coupling capacitors 45*a* and 45*b* disposed on the driver side.

Figure 11:
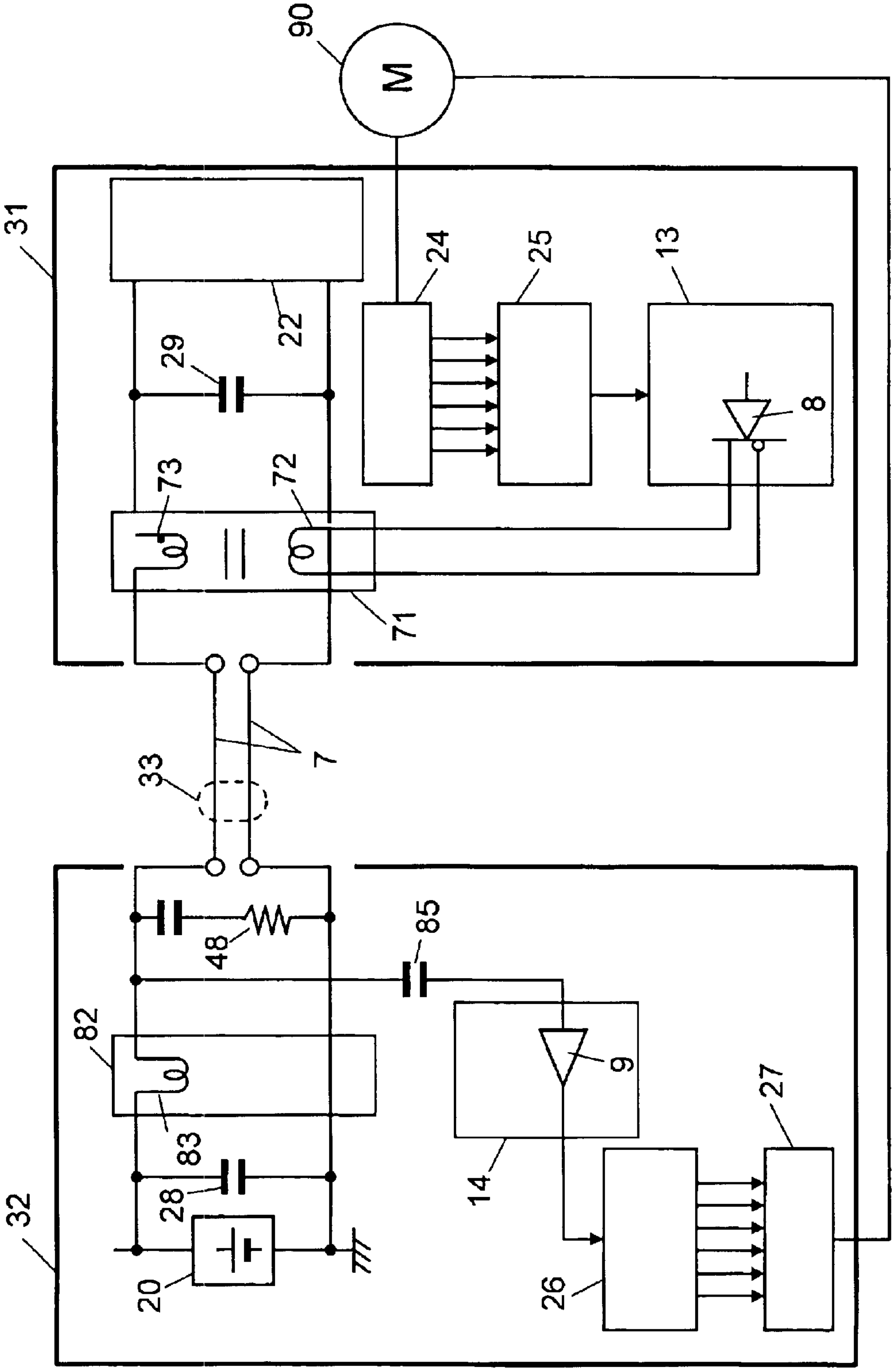
FIG. 11 shows a motor controller of a non-balanced transmission type of motor in accordance with the seventh exemplary embodiment of the present invention.

The motor controller transmits signals through a balanced transmission method. If the motor controller is placed in an excellent environment, signals can be transmitted through non-balanced method, which is shown in FIG. 11. In FIG. 11, elements similar to those of the previous embodiments have the same reference marks and the descriptions thereof are omitted here. The motor controller shown in FIG. 11 comprises the following elements:

choke coil 82—disposed on the detector side—having one winding 83;

one coupling capacitor 85 disposed on the driver side;

motor-position-receiving element 14 having signal-receiving circuit 9; and transformer 71 having one signal winding 72 and one power winding 73.

The motor controller transmits signals through the non-balanced method. The structure shown in FIG. 11 is smaller and less expensive than that shown in FIG. 10.

(Eighth Exemplary Embodiment)

Figure 12:
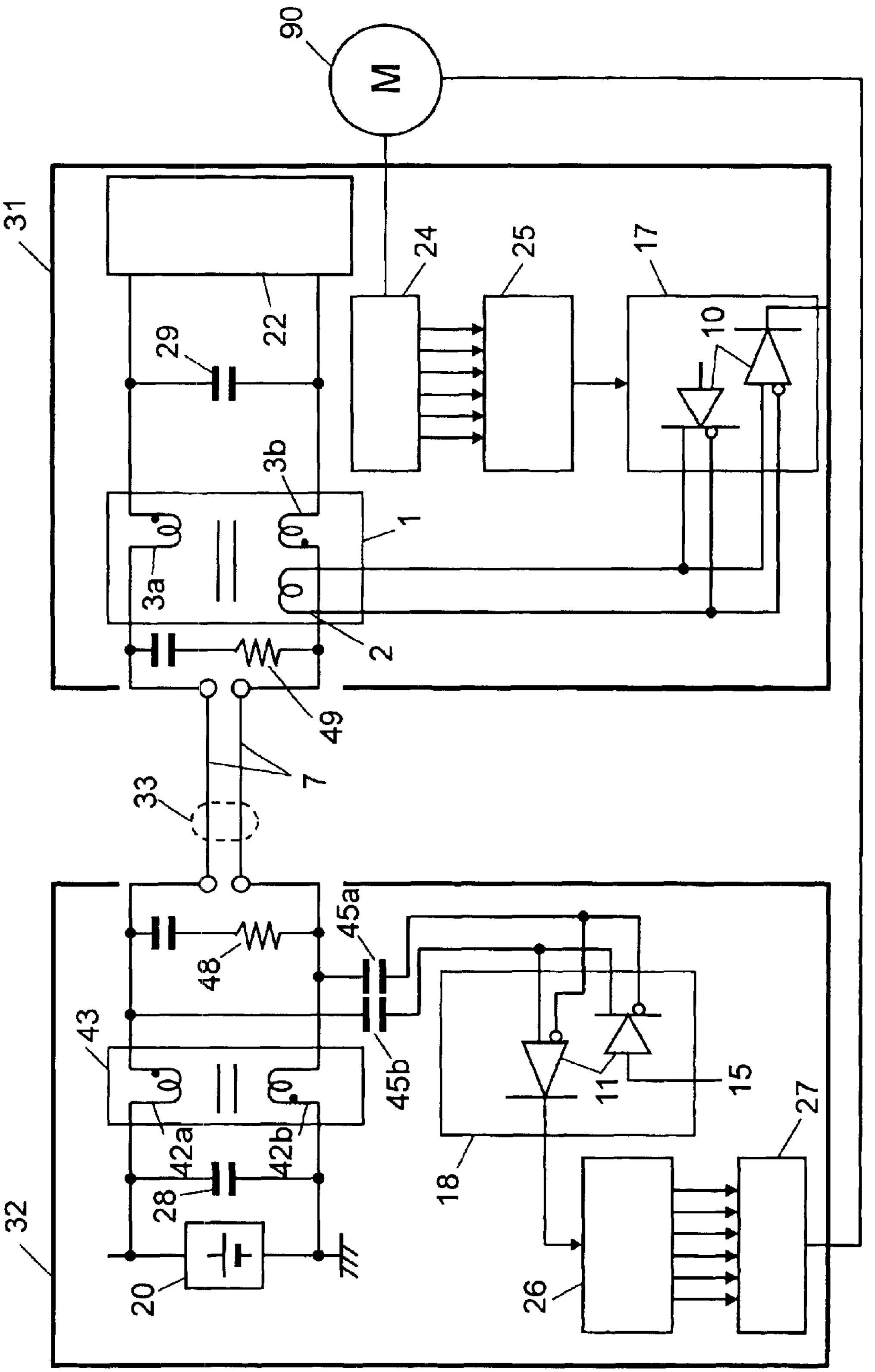
FIG. 12 shows a motor controller in accordance with an eighth exemplary embodiment of the present invention.

FIG. 12 illustrates the motor controller in accordance with the eighth embodiment of the present invention. In this embodiment, a new structure is added to the seventh embodiment shown in FIG. 10. Elements similar to those in the seventh embodiment have the same reference marks, and the descriptions thereof are thus omitted here. The motor controller in accordance with this eighth embodiment can communicate information, as same as the second embodiment, between motor driver 32 and motor-position detector 31 in both ways.

Motor driver 32 further includes a control-signal-transmitting circuit which transmits a detector-controlling signal—requesting the positional information about the motor—to detector 31. To be more specific, driver 32 employs transmitting/receiving circuit 18 having transceiver 11, so that driver 32 is equipped with both of a motor-position-receiving circuit and the control-signal-transmitting circuit. Detector 31 further includes a control-signal-receiving circuit. In other words, detector 31 employs transmitting/receiving circuit 17 having transceiver 10, so that detector 31 is equipped with both of a motor-position-transmitting circuit and the control-signal-receiving circuit.

Transceivers 10 and 11 input and output signals in two ways in a differential manner, and employ interface ICs available in the market. Terminator resistor 49—having the same resistor value as a characteristic impedance of power cable 33—is connected between lines in the power receiving path between power cable 33 and transformer 1 on the detector side in order to prevent a signal from reflecting. The control-signal-transmitting circuit in transmitting/receiving circuit 18 outputs detector-controlling signal 15—requesting the positional information about the motor—to coupling capacitors 45*a* and 45*b* on the driver side. Signal 15 travels to the control-signal-receiving circuit in transmitting/receiving circuit 17 via power cable 33 and signal winding 2 on the detector side.

(Ninth Exemplary Embodiment)

FIGS. 13–17 illustrate the motor controller in accordance with the ninth embodiment of the present invention. Elements similar to those in the previous embodiments have the same reference marks, and the descriptions thereof are thus omitted here. This embodiment relates to improvement in the structures of power-supplying circuit 20 and power-receiving circuit 22. In FIGS. 13–17, signal-coupling circuit 61 on the detector side and signal-coupling circuit 62 on the driver side represent the transformer, or the choke coil and the coupling capacitor described in previous embodiments. Other members disposed in motor-position detector 31 and motor driver 32 are omitted from the drawings, because they are the same as those in the previous embodiments.

Figure 13:
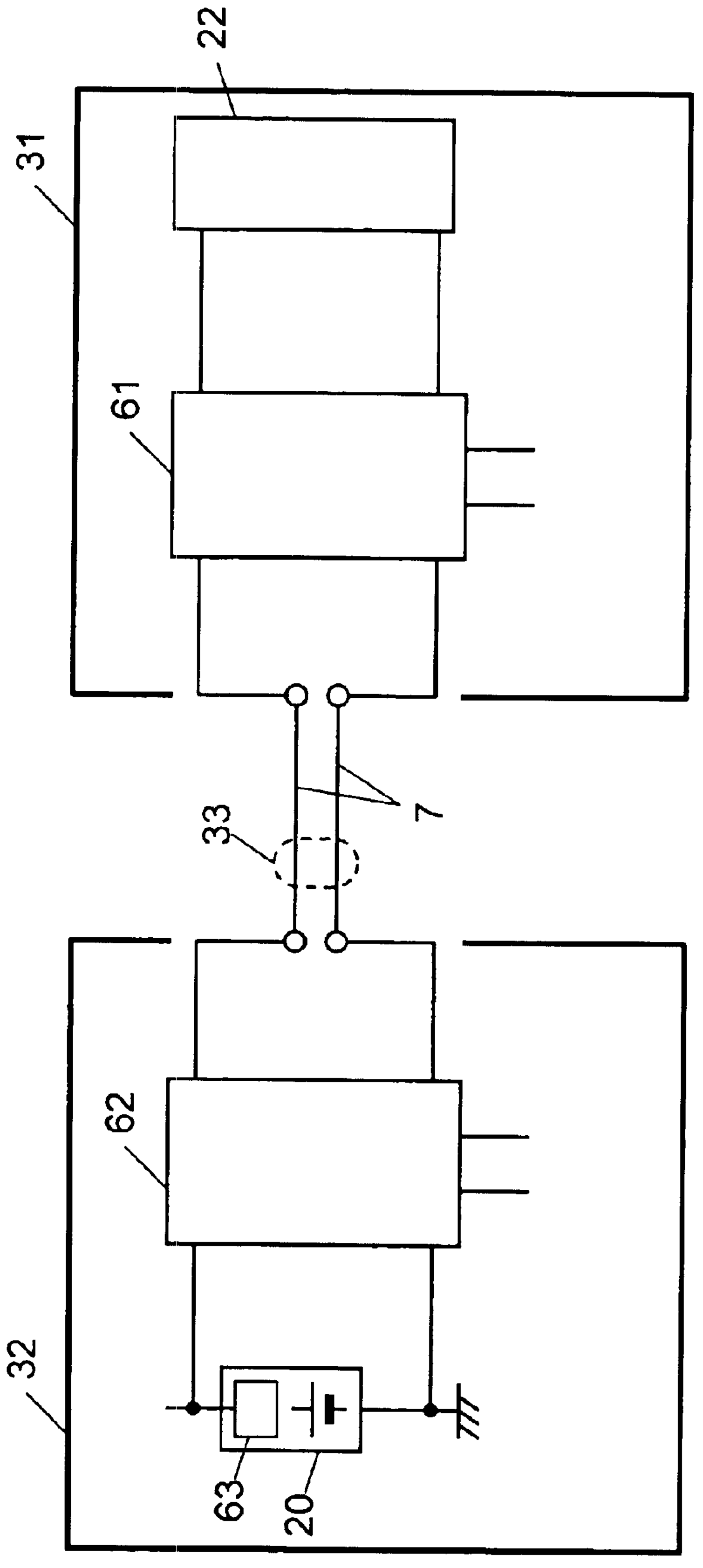
FIG. 13 illustrates a first measure to compensate a voltage drop in a power cable in a ninth exemplary embodiment of the present invention.
Figure 14:
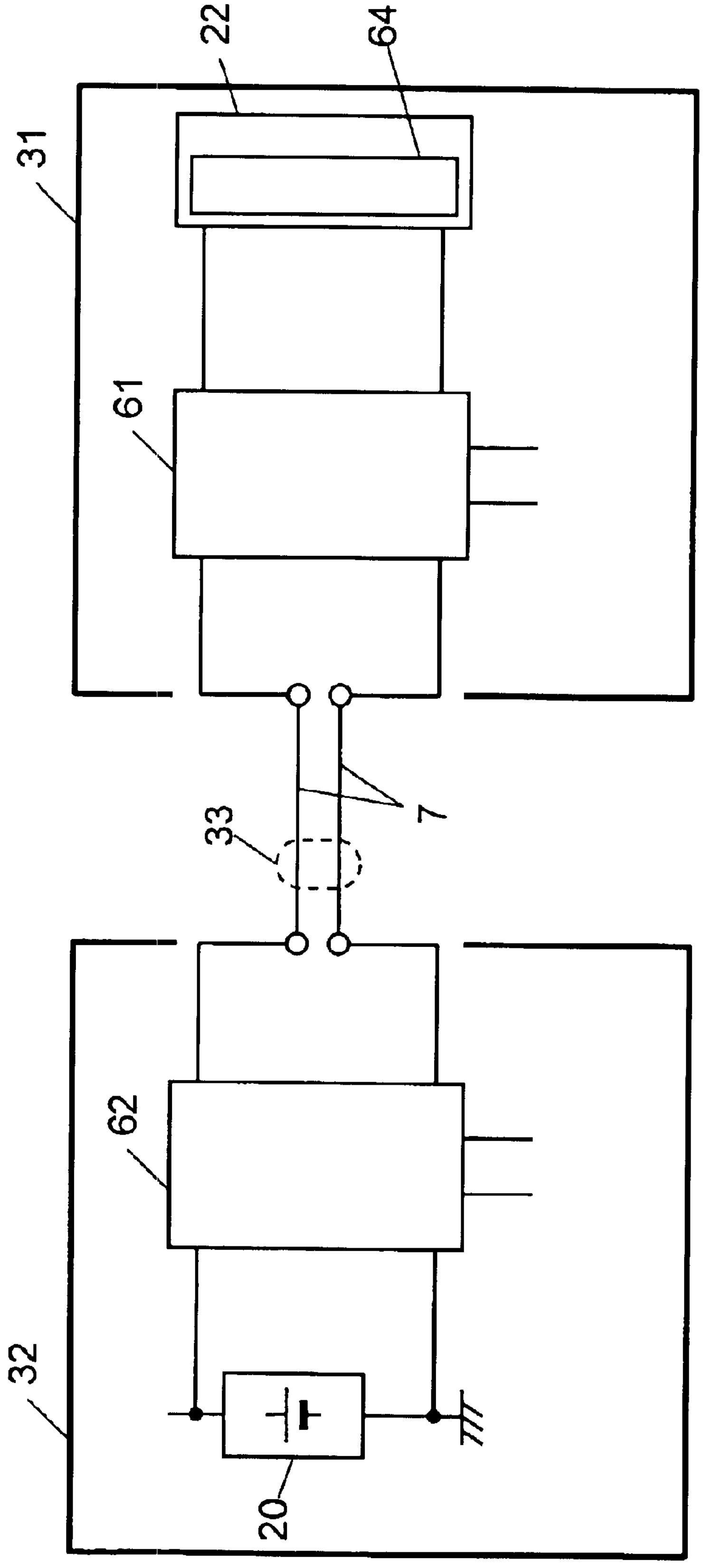
FIG. 14 illustrates a second measure to compensate a voltage drop in a power cable in the ninth exemplary embodiment of the present invention.
Figure 15:
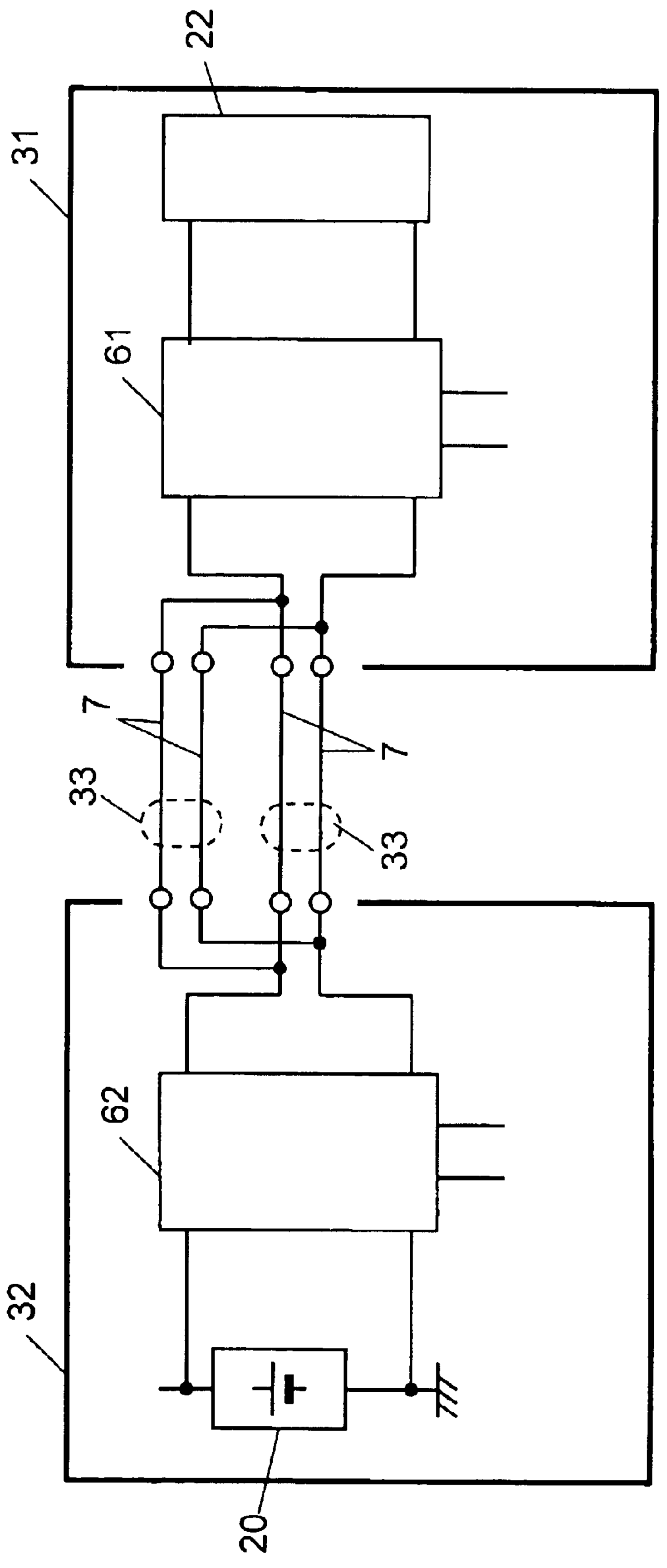
FIG. 15 illustrates a third measure to compensate a voltage drop in a power cable in a ninth exemplary embodiment of the present invention.
Figure 16:
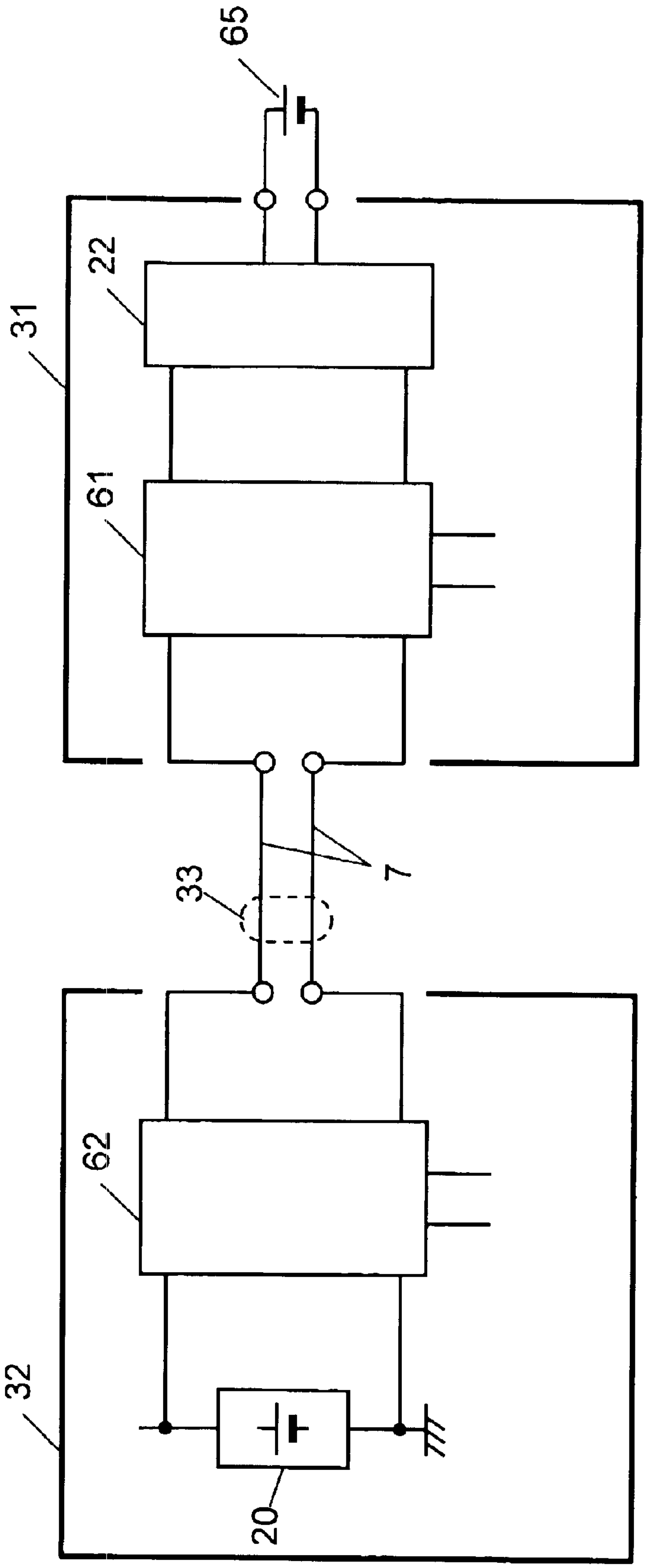
FIG. 16 illustrates a fourth measure to compensate a voltage drop in a power cable in the ninth exemplary embodiment of the present invention.
Figure 17:
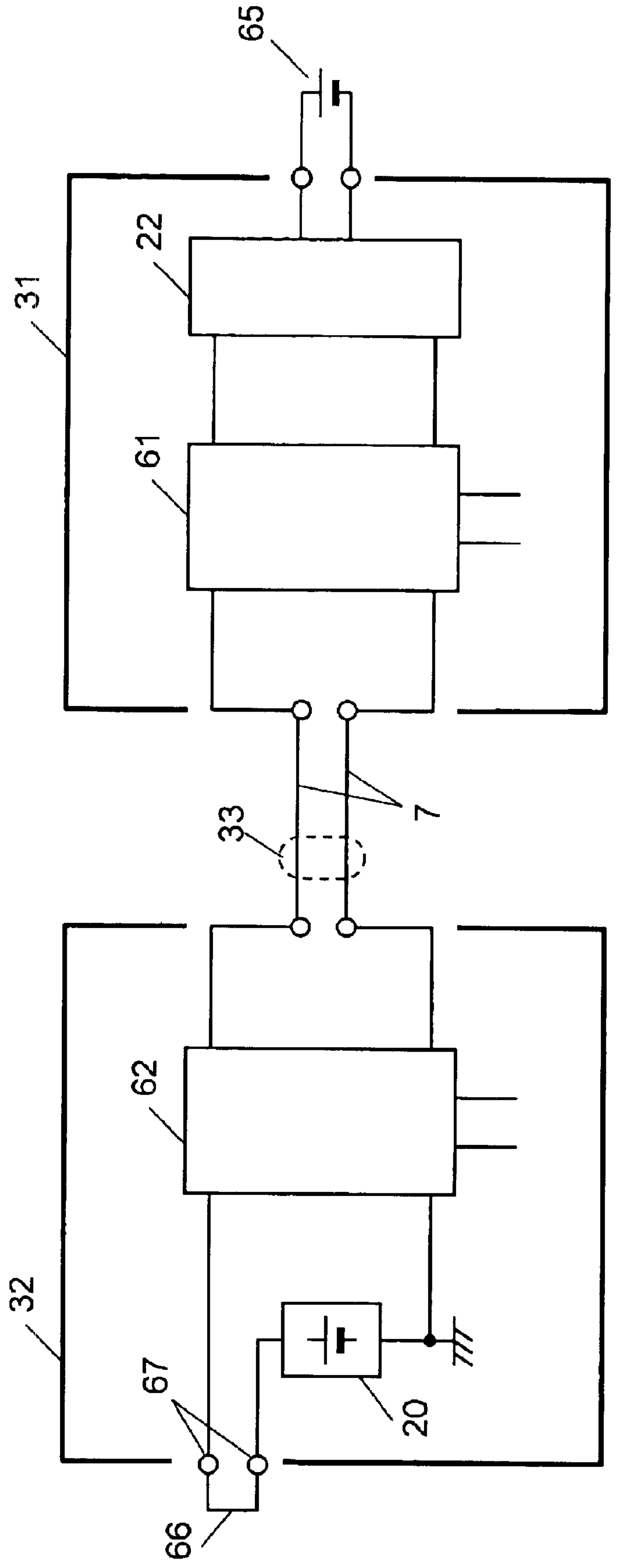
FIG. 17 illustrates a fifth measure to compensate a voltage drop in a power cable in the ninth exemplary embodiment of the present invention.

Power-supplying circuit 20 of motor driver 32 supplies, e.g., DC 5V as a control power, to power-receiving circuit 22 via power cable 33. Since voltage drop is expected in proportion to the length of cable 33, some preventive measures are desirably provided for circuit 22 to receive the 5V in a stable manner. One of or some of the following measures is desirably adopted:

1. As shown in FIG. 13, supply-voltage adjusting circuit 63 is provided to circuit 20, so that the voltage to be supplied is boosted to compensate the voltage drop due to the length of power cable 33. For instance, if the power voltage used in detector 31 is 5V and the voltage drop of 2V is expected through power cable 33, an output voltage of circuit 20 should be adjusted to 7V so that power-receiving circuit 22 can receive 5V.
2. As shown in FIG. 14, voltage regulator 64 is provided to circuit 22. Circuit 20 outputs a high voltage accommodating the maximum length of power cable 33, and voltage regulator 64 stabilizes the received voltage to 5V.
3. As shown in FIG. 15, a plurality of power cables 33 are used in parallel so that the voltage drop can be reduced. Driver 32 and detector 31 have terminals to be connected with the plurality of cables 33. If the length of cable 33 is short, one cable can be used; however, if the length is long, plural cables are used.
4. As shown in FIG. 16, power-receiving circuit 22 can be powdered from both of circuit 20 and outer power source 65. Detector 31 has terminals to be coupled to outer power source 65. When a short cable is used, power source 65 is not coupled; however, when a long cable is used, power source 65 is coupled to the terminals.
5. As shown in FIG. 17, circuit 22 is powered from outer power source 65. Driver 32 includes a cut-section 67 of output lines from circuit 20 and has shorting-member 66 mounted to the cut-section in order to short the output lines. The output lines are cut when shorting member 66 is removed from cut-section 67. Detector 31 has terminals to be coupled to outer power source 65; however, when short cable 33 is used, power source 65 is not coupled, and is powered by circuit 20. When long cable 33 is used and a large voltage drop is expected, power source 65 is coupled to power detector 31. At this time, shorting member 66 is removed from cut-section 67 so that circuit 20 can stop powering detector 31.

(Tenth Exemplary Embodiment)

FIGS. 18–22 illustrate the motor controller in accordance with the tenth embodiment. Elements similar to those of the previous embodiments have the same reference marks. This embodiment relates to improvement of the transmitting/receiving circuit used therein, and more particularly, it relates to a fail-safe circuit which detects something unusual in a received signal due to an abnormality of power cable 33 and the like.

Figure 18:
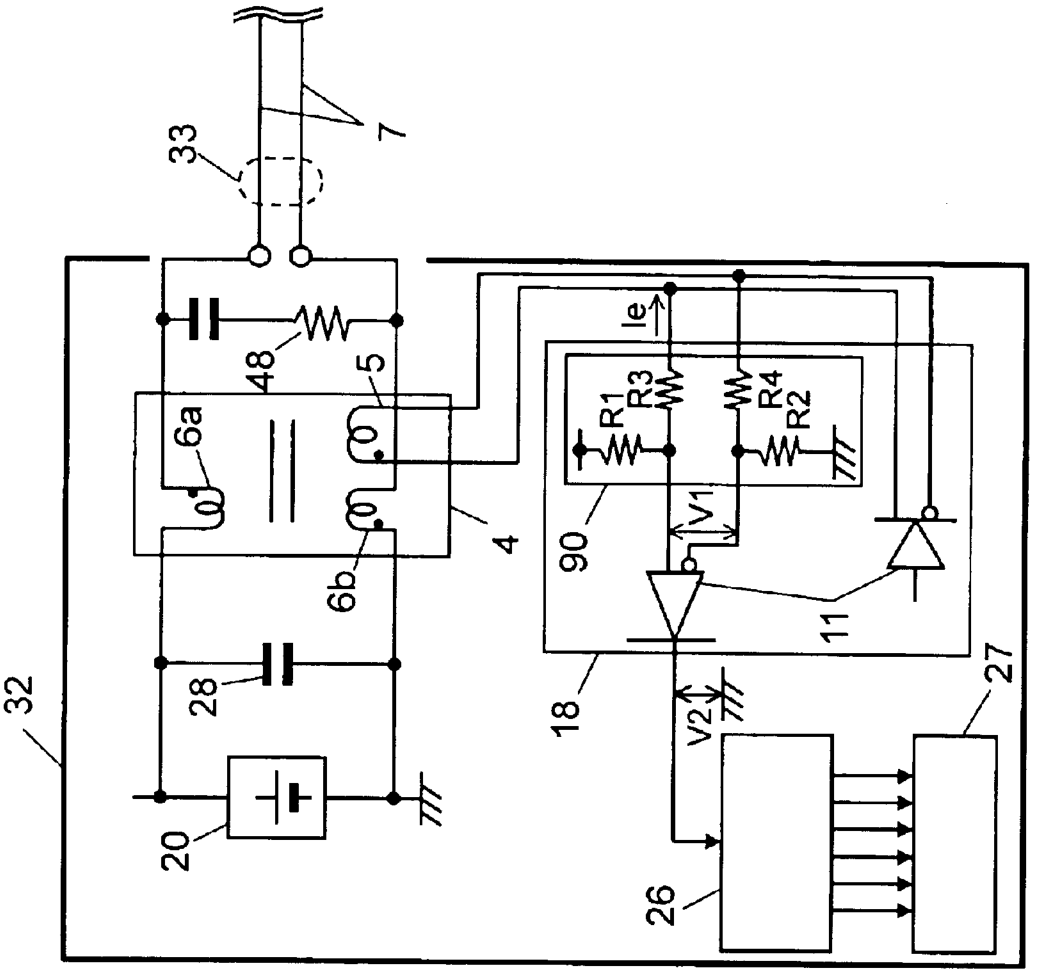
FIG. 18 illustrates a fail-safe circuit attached to a receiving circuit on the driver side in a case of transformer-coupling in a tenth exemplary embodiment of the present invention.

FIG. 18 illustrates fail-safe circuit 90 attached to the receiving terminals of transceiver 11. When at least one of lines 7—7 of power cable 33 is broken, input voltage V1 at the receiving terminals falls into between −200 mV and +200 mV, i.e., −200 mV<V1<+200 mV, provided no fail-safe circuit 90 is available. Thus output voltage V2 of the receiving circuit becomes unstable and irregular. In this case, the motor controller is desirably stopped for safety purpose. The resisting values of pull-up resistor R1 of circuit 90, pull-down resistor R2, R3 and R4 both being put in the receiving circuit, are set such that V1 becomes not less than +200 mV by a divisional ratio of the resistors, through which current travels from the power supply of the detector in the order of R1, R3, signal winding 5, R4, R2 and 0V. For instance, when the detector employs a power supply of 5V, the resistor values are set as follows:

R1=R2=43 k ohm, R3=R4=2.2 k ohm.

Since the resistor in the fail-safe circuit becomes a load to the transmitting circuit, fail-safe circuit 90 desirably uses a maximum possible resistor value. Further, R1 and R2 are desirably set much greater than R3 and R4 respectively, so that the receiving circuit is not affected by the resistor value in receiving signals. As a result, when power cable is broken, output voltage V2is fixed at a high level (H) or a low level (L), so that V2 indicates an abnormal in the receiving lines. In the circuit shown in FIG. 18, V2 is fixed at level H, so that the motor controller stops upon an indication of abnormality. In order to prevent magnetic saturation of transformer 4 on the driver side, a winding polarity of signal winding 5 is set such that an ampere turn of signal winding 5 due to current "Ie" cancels the ampere turn of power windings 6*a* and 6*b*.

Figure 19:
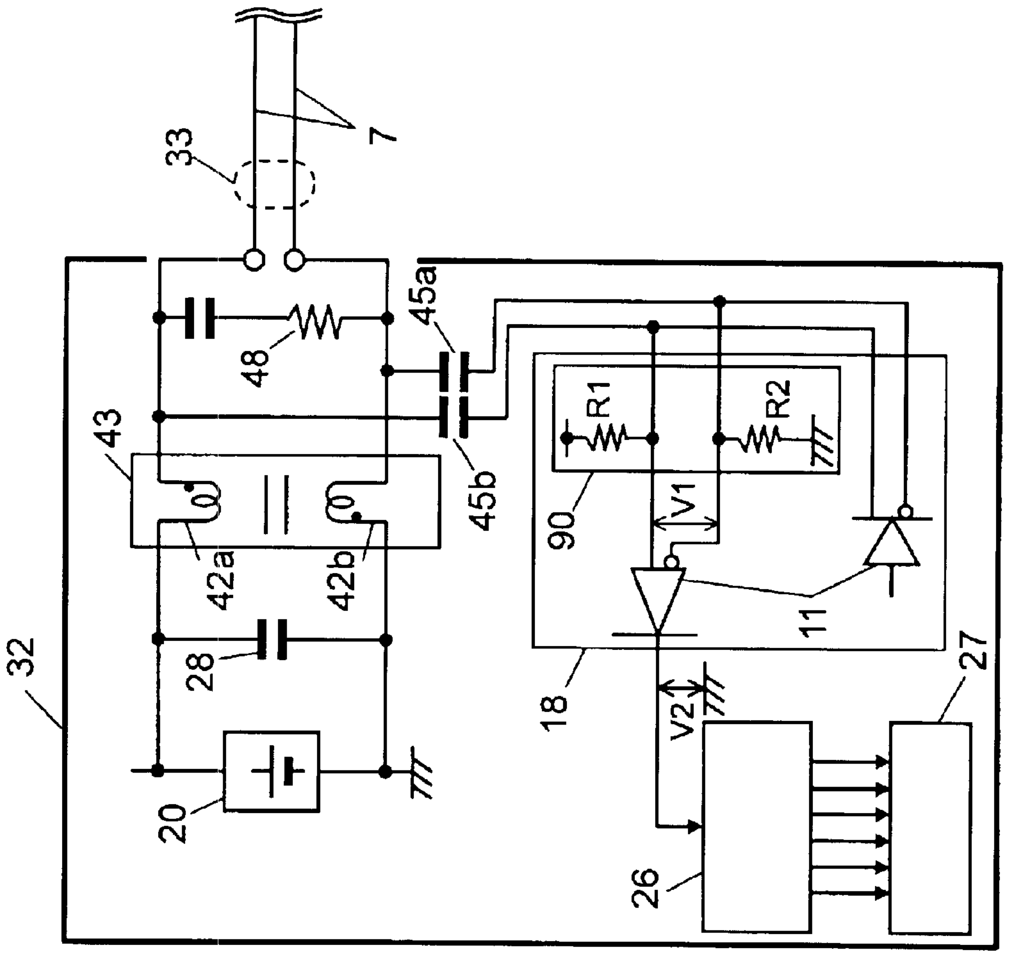
FIG. 19 illustrates a fail-safe circuit attached to a receiving circuit on the driver side in a case of capacitor-coupling in the tenth exemplary embodiment of the present invention.

FIG. 19 illustrates fail-safe circuit 91 attached to the receiving terminals of transceiver 11. The circuit shown in FIG. 19 employs coupling capacitors 45*a* and 45*b* for transmitting signals. If something wrong happens, such as a break in cable 33, and signals thus do not arrive at the circuit shown in FIG. 19, a voltage of the input pin coupled to pull-up resistor R1 becomes at +side of the power voltage in the detector. A voltage of the input pin coupled to pull-down resistor R2 becomes the same voltage as the grounding voltage of the circuits in the detector. Thus V1 is forced to be the same voltage as the power supply voltage in the detector. As a result, output voltage V2 is fixed at level H or level L, so that an abnormality of receiving lines is indicated. (In FIG. 18, V2 is fixed at level H.) Upon this indication, the motor controller stops. The resisting value of pull-up resistor R1 and pull-down resistor R2 are set at, e.g., R1=R2=100 k ohm. Since the resistors become load to the transmitting circuit, it is desirable to use a maximum possible resistor value.

Figure 20:
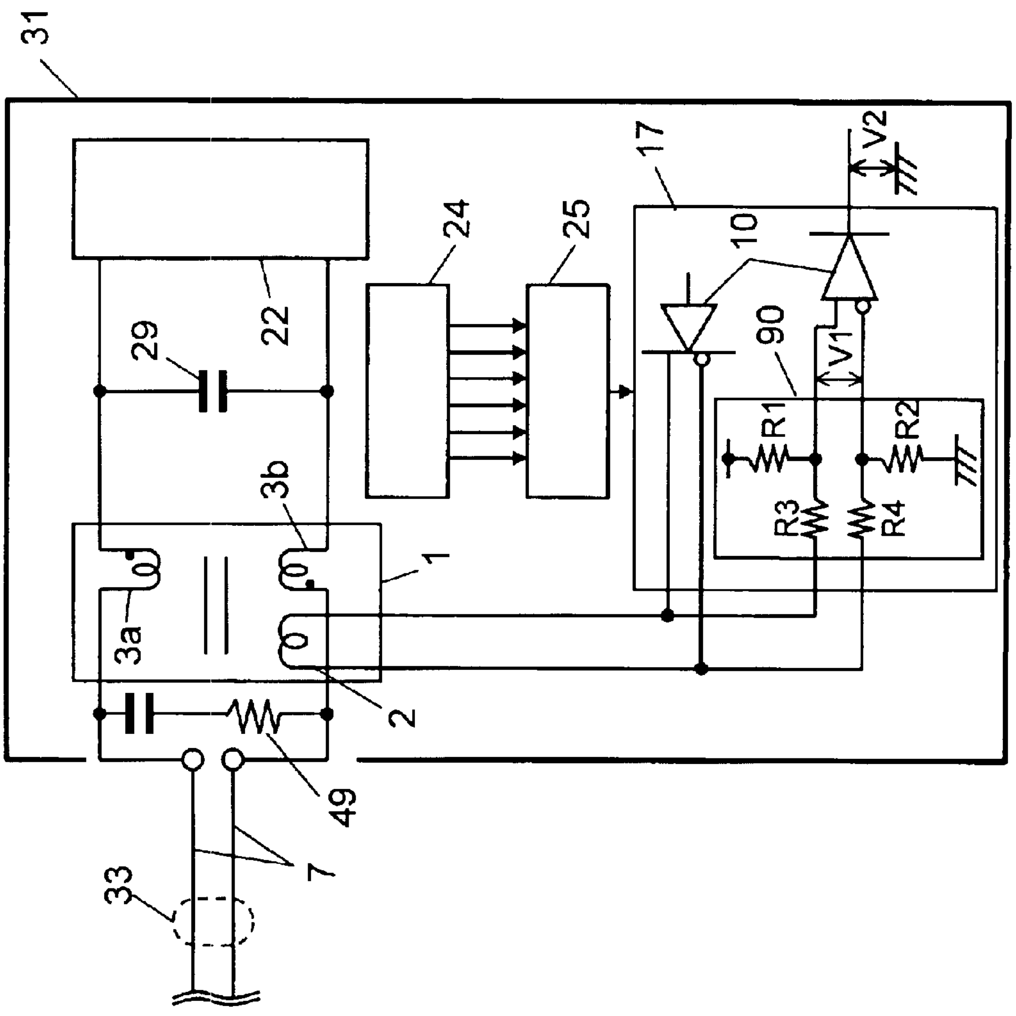
FIG. 20 illustrates a fail-safe circuit attached to a receiving circuit on the detector side in the case of the transformer-coupling in the tenth exemplary embodiment of the present invention.

FIG. 20 shows fail-safe circuit 90 attached to the receiving terminals of transceiver 10. When at least one of lines 7—7 is broken, circuit 90 detects an abnormality in the receiving lines in the same way as the case shown in FIG. 18.

Figure 21:
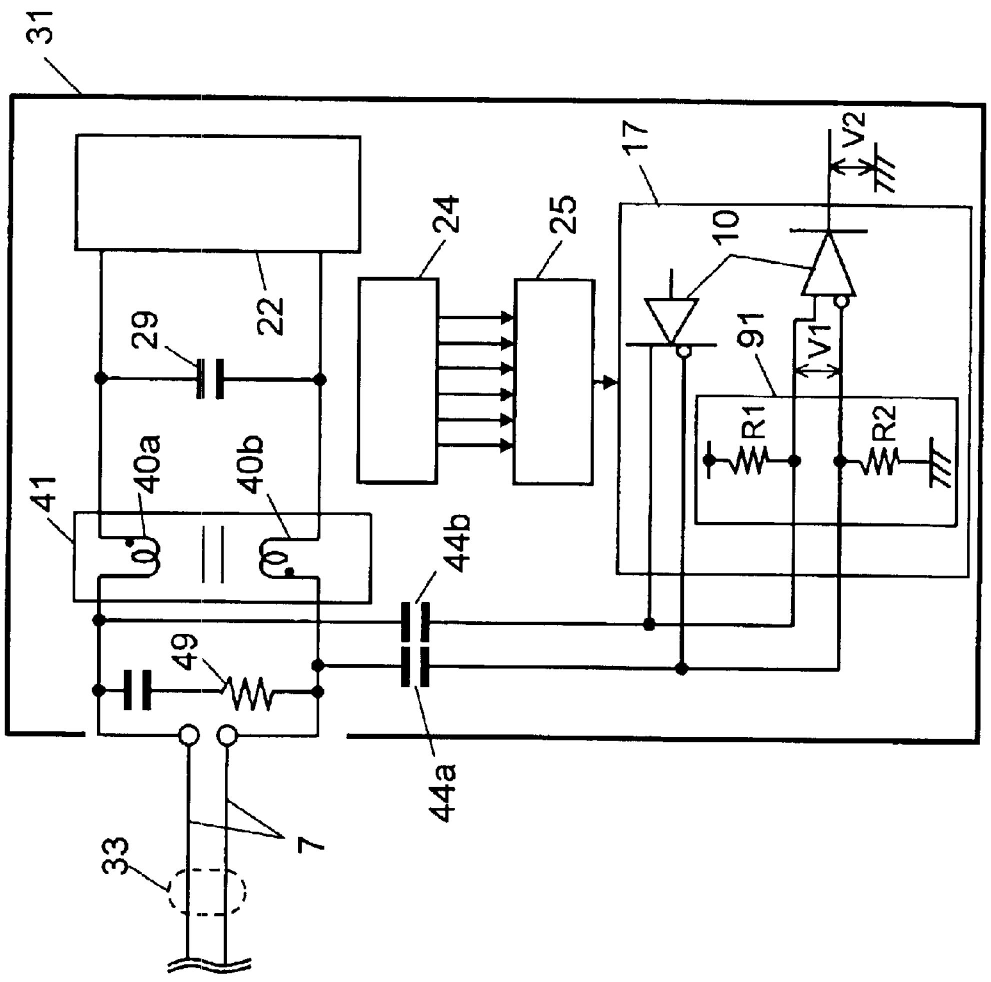
FIG. 21 illustrates a fail-safe circuit attached to a receiving circuit on the detector side in the case of the capacitor-coupling in the tenth exemplary embodiment of the present invention.

FIG. 21 shows fail-safe circuit 91 attached to the receiving terminals of transceiver 10. The circuit shown in FIG. 21 employs coupling capacitors 44*a* and 44*b* for transmitting signals. If something wrong, such as a break in cable 33, happens and signals thus do not arrive at the circuit, fail-safe circuit 91 detects an abnormality in the receiving lines in the same manner as the case shown in FIG. 18.

Figure 22:
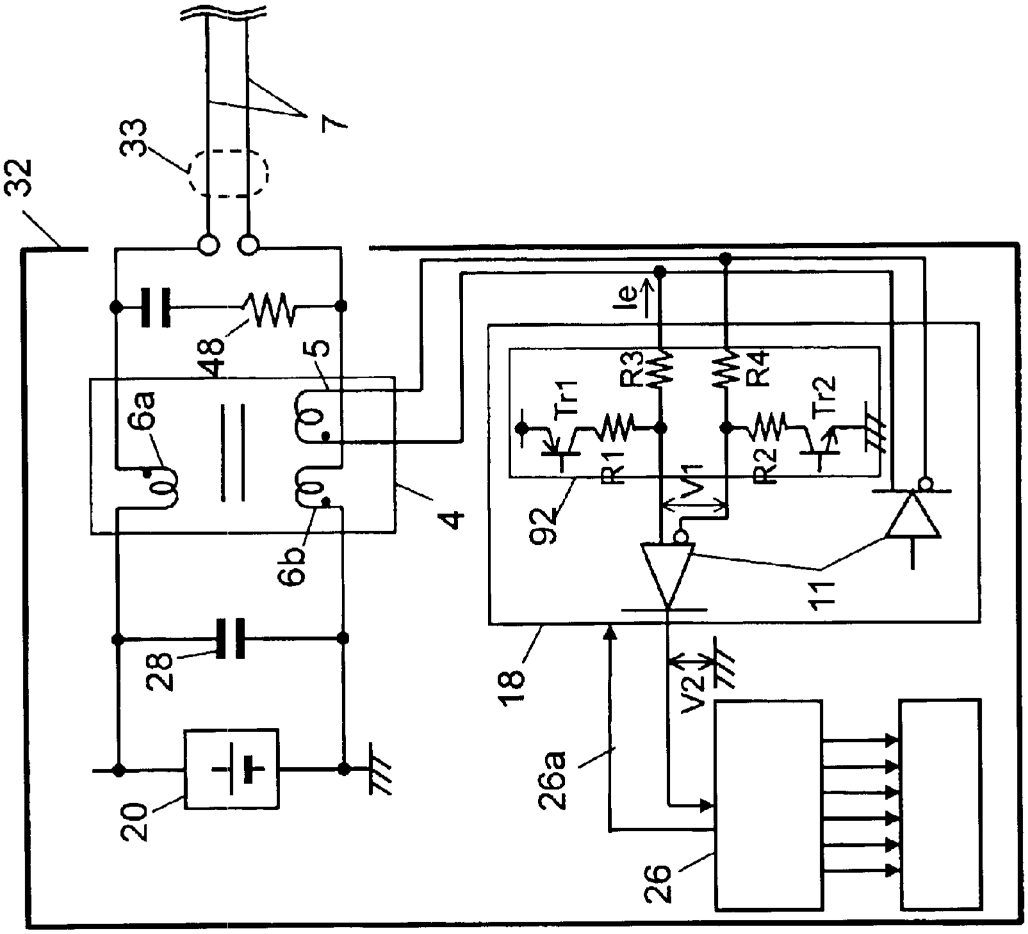
FIG. 22 shows a fail-safe circuit, which can be turned to inactive status with a transmission-mode signal, in accordance with the tenth exemplary embodiment of the present invention.

The fail-safe circuit can be inactive when signals are transmitted. FIG. 22 shows fail-safe circuit 92 as an example, where transistors Tr1 and Tr2 used as switching elements are turned off by transmission-mode signal 26*a* supplied from decoding circuit 26 when signals are transmitted, so that fail-safe circuit 92 is turned to inactive status. When signals are received, no transmission-mode signal 26*a* is available, thus transistors Tr1 and Tr2 are turned on, so that turning circuit 92 is turned to active status. If the receiving lines including signal winding 5 of transformer 4, circuit 92 in the active status detects an abnormality in the receiving lines in the same manner as the case shown in FIG. 18. Fail-safe circuit 92 in the inactive status does not become load to the transmitting circuit when signals are transmitted.

(11th Exemplary Embodiment)

Figure 23:
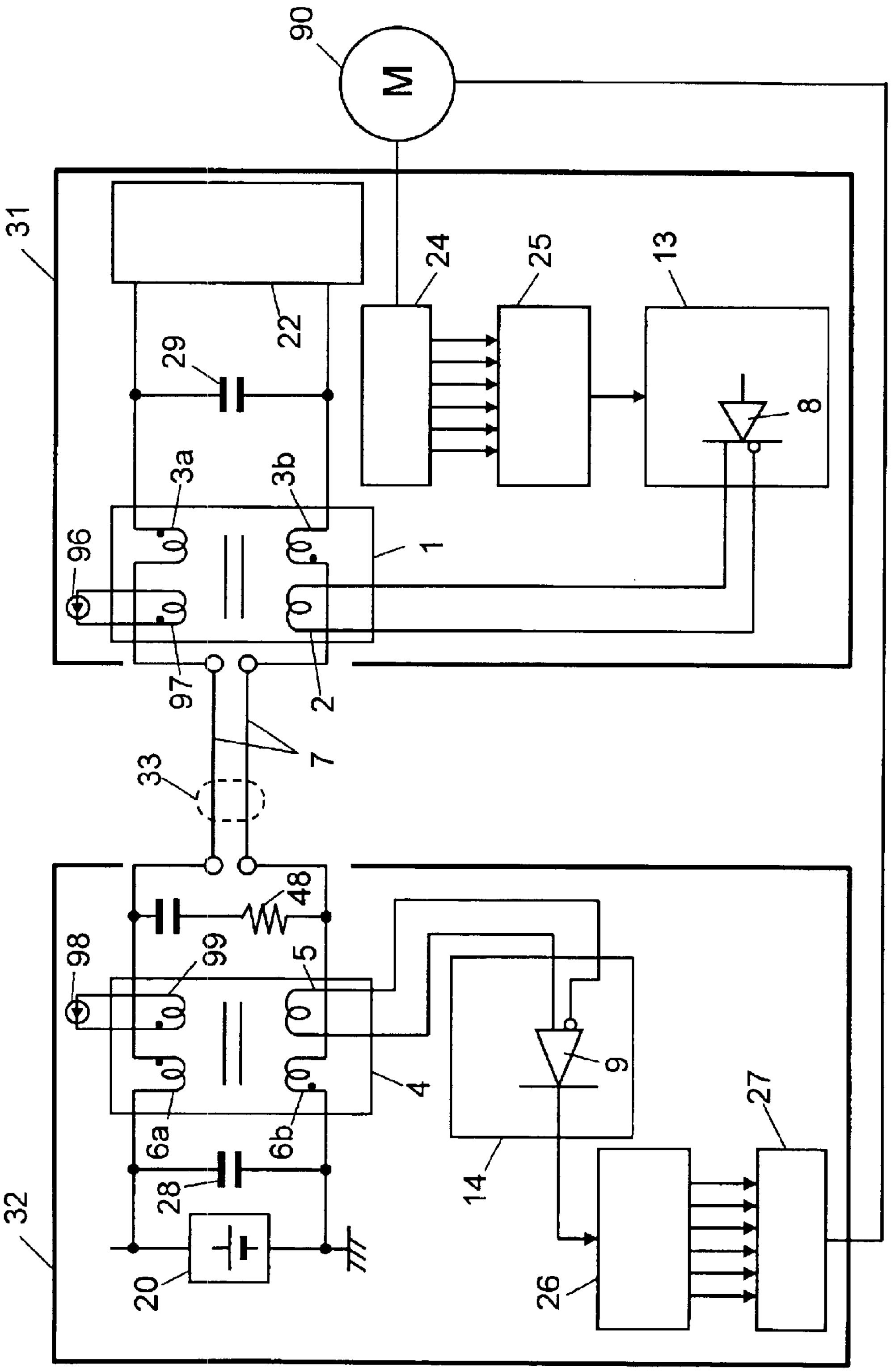
FIG. 23 illustrates how to prevent magnetic saturation in a transformer in an eleventh exemplary embodiment of the present invention.
Figure 24:
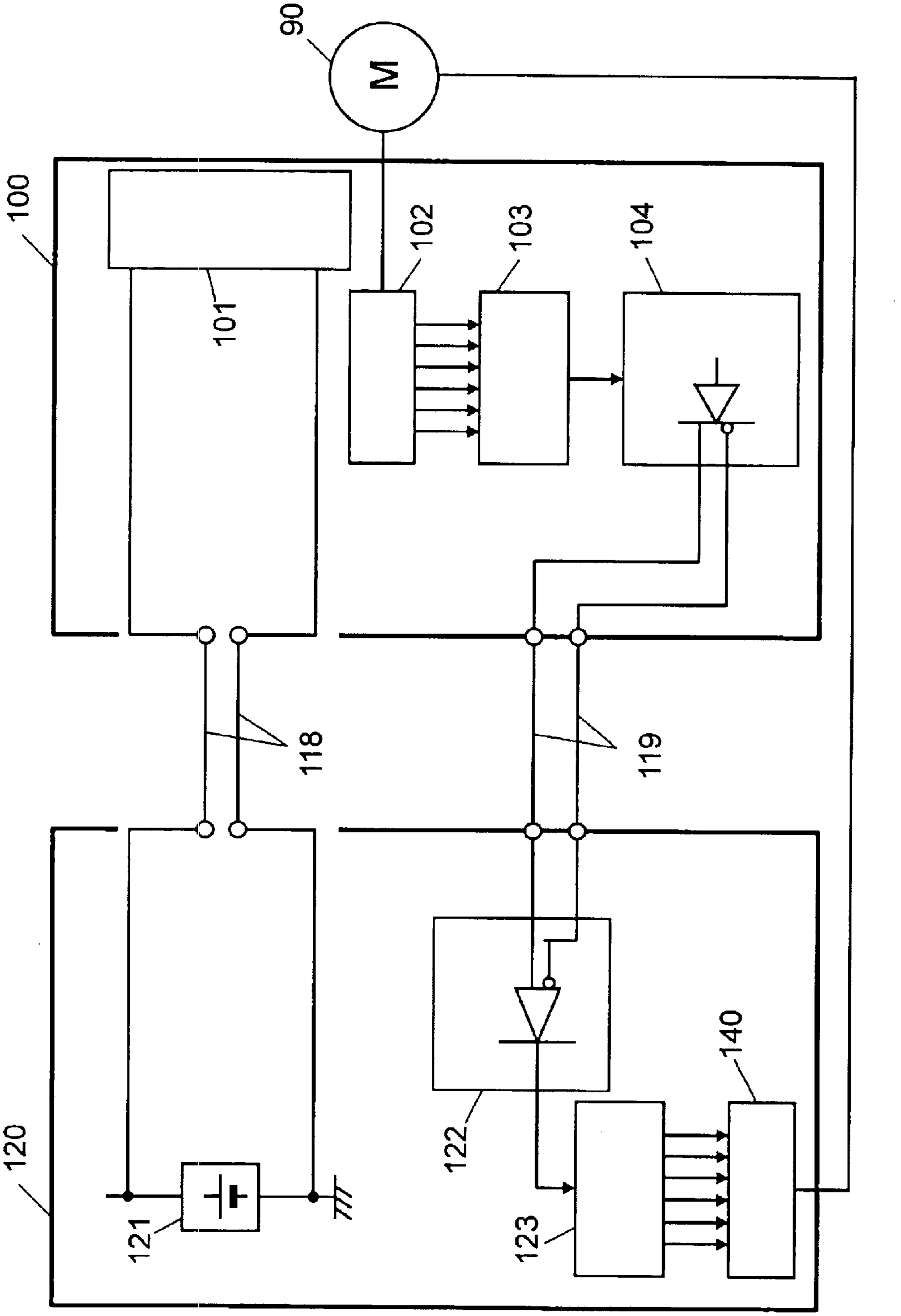
FIG. 24 shows a conventional motor controller.
Figure 25:
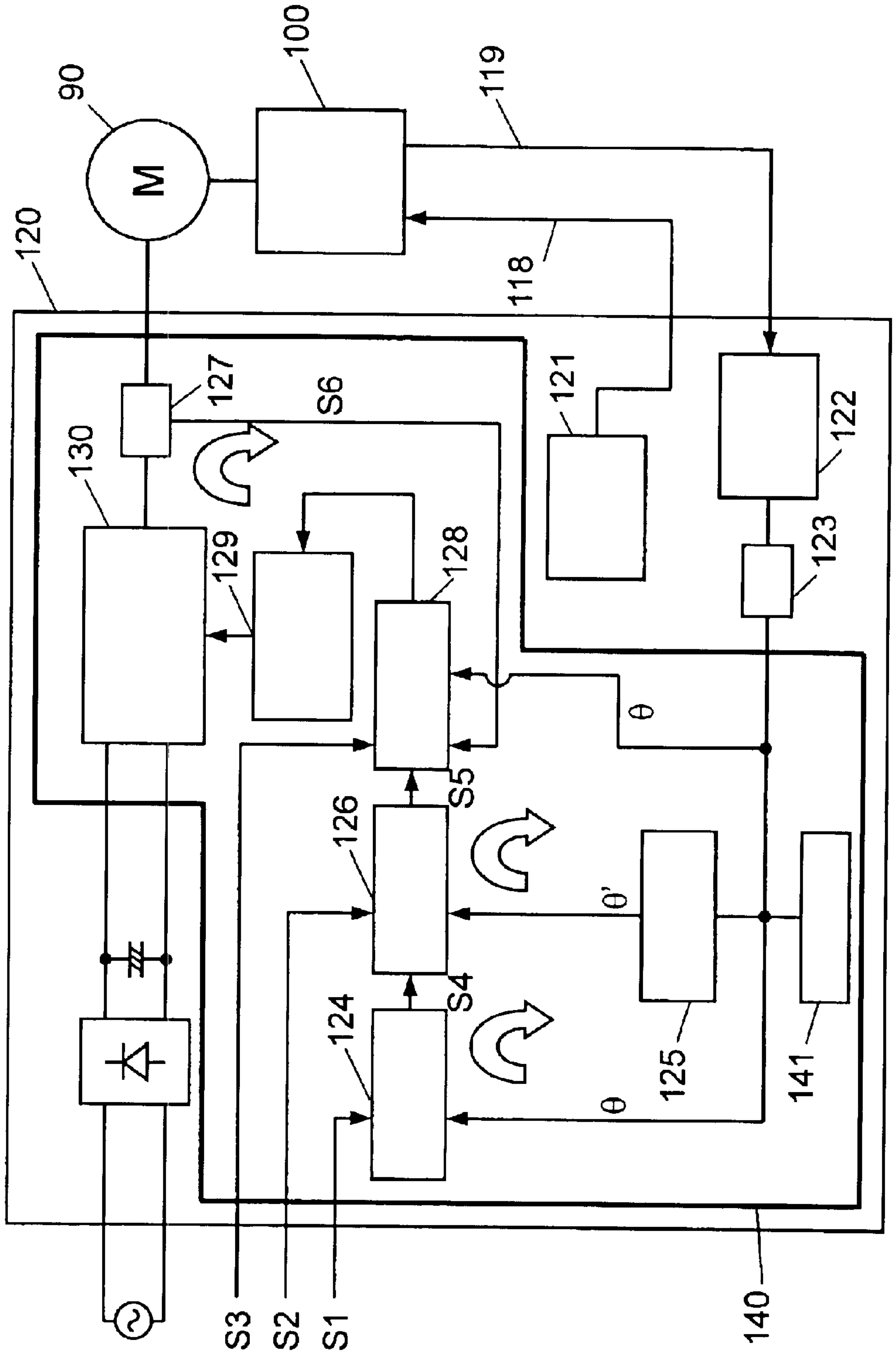
FIG. 25 illustrates a motor driving circuit of the conventional motor controller in detail.

FIG. 23 illustrates the motor controller in accordance with the 11th embodiment of the present invention. Elements similar to those in the previous embodiments have the same reference marks. This embodiment relates to magnetic saturation in transformer 1 on the detector side and transformer 4 on the driver side.

As shown in FIG. 23, transformer 1 has canceling winding 97. In order to prevent the magnetic saturation in transformer 1, the winding polarity of winding 97 is set such that the ampere-turn of winding 97 caused by the current from DC power source 96 cancels the ampere-turn of power windings 3*a* and 3*b*. Transformer 4 has canceling winding 99. In order to prevent the magnetic saturation in transformer 4, the winding polarity of winding 99 is set such that the ampere-turn of winding 99 caused by the current from DC power source 98 cancels the ampere-turn of power windings 6*a* and 6*b*.

Industrial Applicability

A number of electric lines coupling a motor-position detector to a motor driver is minimized to two, thus troubles and loose connections in connectors—those failures are proportionate to a number of electric lines coupling devices—can be reduced. The minimum number of coupling lines between the detector and the driver can reduce the time and labor for installing the motor. The motor controller of the present invention thus can be used advantageously in various applications.

What is claimed is:

1. A motor controller comprising:

a motor-position detector; and a motor driver, coupled to said motor-position detector by a power cable having a pair of electric lines, for supplying control-power to said detector via the power cable, wherein said controller transmits information about driving a motor between said detector and said driver via the power cable, wherein said motor-position detector includes:

a power-receiving section;

a power-receiving path for coupling the power cable to the power-receiving section;

a signal-coupling circuit, disposed on said detector side, for AC coupling with the power-receiving path;

a motor-position-detecting circuit for outputting parallel information about motor-position;

an encoding circuit for converting the parallel information about the motor-position into serial information; and a motor-position-transmitting circuit for outputting the serial information about the motor-position to the signal-coupling circuit, wherein said motor driver includes:

a power-supplying section;

a power-supplying path for coupling the power-supplying section to the power cable;

a signal-coupling circuit, disposed on said driver side, for AC coupling with the power-supplying path;

a motor-position-receiving circuit for receiving serial information about the motor-position from the signal-coupling circuit on said driver side;

a decoding circuit for converting the serial information about the motor-position into parallel information; and a motor-driving circuit for driving the motor according to the parallel information thus obtained.

2. The motor controller of claim 1, wherein said driver further includes a control-signal-transmitting circuit for outputting a detector-controlling signal to the signal-coupling circuit on said driver side, and said detector further includes a control-signal-receiving circuit for receiving the detector-controlling signal from the signal-coupling circuit on said detector side.

3. The motor controller of claim 1, wherein said driver further includes a capacitor connected between lines in the power-supplying path between the signal-coupling circuit on said driver side and the power-supplying section.

4. The motor controller of claim 1, wherein said detector further includes a capacitor connected between lines in the power-receiving path between the signal-coupling circuit on said detector side and the power-receiving section.

5. The motor controller of claim 1, wherein said driver further includes one of a resistor and a resistor coupled in series with a capacitor, both being connected between lines in the power-supplying path between the signal-coupling circuit on said driver side and the power cable, the resistor having an identical resisting value to a characteristic impedance of the power cable.

6. The motor controller of claim 2, wherein said detector further includes one of a resistor and a resistor coupled in series with a capacitor, both being connected between lines in the power-receiving path between the signal-coupling circuit on said detector side and the power cable, the resistor having an identical resisting value as a characteristic impedance of the power cable.

7. The motor controller of claim 1, wherein twisted-paired electric lines are used for the power cable.

8. The motor controller of claim 1, wherein shielded twisted-paired electric lines are used for the power cable.

9. The motor controller of claim 1, wherein the signal-coupling circuit disposed on said detector side includes a transformer on said detector side, the transformer having a power winding and a signal winding, the power winding of the transformer on said detector side being inserted into the power-receiving path, the motor-position-transmitting circuit outputs the serial information about the motor-position to the signal winding of the transformer on the detector side, the signal-coupling circuit disposed on said driver side includes a transformer on said driver side, the transformer having a power winding and a signal winding, the power winding of the transformer on said driver side being inserted into the power-supplying path, and the motor-position-receiving circuit inputs the serial information about the motor-position from the signal winding of the transformer on said driver side.

10. The motor controller of claim 9, wherein said driver further includes a control-signal-transmitting circuit for outputting a detector-controlling signal to the signal winding of the transformer on said driver side, and said detector further includes a control-signal-receiving circuit for inputting the detector-controlling signal from the signal winding of the transformer on said detector side.

11. The motor controller of claim 1, wherein the signal-coupling circuit disposed on said detector side includes a choke coil and a coupling capacitor, both disposed on said detector side, the choke coil on said detector side being inserted into the power-receiving path, and a first end of the coupling capacitor on said detector side being coupled to the power-receiving path between the power cable and the choke coil on the detector side, the motor-position-transmitting circuit outputs the serial information about the motor-position to a second end of the coupling capacitor on said detector side, the signal-coupling circuit disposed on said driver side includes a choke coil and a coupling capacitor, both being disposed on said driver side, the choke coil on said driver side being inserted into the power-supplying path, and a first end of the capacitor on said driver side is coupled to the power-supplying path between the power cable and the choke coil on the driver side, the motor-position-receiving circuit inputs the serial information about the motor-position from a second end of the coupling capacitor on said driver side.

12. The motor controller of claim 11, wherein said driver further includes a control-signal-transmitting circuit for outputting a detector-controlling signal to the second end of the coupling capacitor on said driver side, and said detector further includes a control-signal-receiving circuit for inputting the detector-controlling signal from the second end of the coupling capacitor on said detector side.

13. The motor controller of claim 1, wherein the signal-coupling circuit disposed on said detector side includes a choke coil and a coupling capacitor, both disposed on said detector side, the choke coil on said detector side being inserted into the power-receiving path, and a first end of the coupling capacitor on said detector side being coupled to the power-receiving path between the power cable and the choke coil on the detector side, the motor-position-transmitting circuit outputs the serial information about the motor-position to a second end of the coupling capacitor on said detector side, the signal-coupling circuit disposed on said driver side includes a transformer disposed on said driver side, the transformer having a power winding and a signal winding, the power coil of the transformer on said driver side being inserted into the power-supplying path, the motor-position-receiving circuit inputs the serial information about the motor-position from the signal winding of the transformer on said driver side.

14. The motor controller of claim 13, wherein said driver further includes a control-signal-transmitting circuit for outputting a detector-controlling signal to the signal winding of the transformer on said driver side, and said detector further includes a control-signal-receiving circuit for inputting the detector-controlling signal from the second end of the coupling capacitor on said detector side.

15. The motor controller of claim 1, wherein the signal-coupling circuit disposed on said detector side includes a transformer, disposed on said detector side, having a power winding and a signal winding, the power winding of the transformer on said detector side being inserted into the power-receiving path, the motor-position-transmitting circuit outputs the serial information about the motor-position to the signal winding of the transformer on said detector side, the signal-coupling circuit disposed on said driver side includes a choke coil and a coupling capacitor, both being disposed on said driver side, the choke coil on said driver side being inserted into the power-supplying path, and a first end of the coupling capacitor on said driver side is coupled to the power-supplying path between the power cable and the choke coil on the driver side, the motor-position-receiving circuit inputs the serial information about the motor-position from a second end of the coupling capacitor on said driver side.

16. The motor controller of claim 15, wherein said driver further includes a control-signal-transmitting circuit for outputting a detector-controlling signal to the second end of the coupling capacitor on said driver side, and said detector further includes a control-signal-receiving circuit for inputting the detector-controlling signal from the signal winding of the transformer on said detector side.

17. The motor controller of claim 1, wherein the power supplying section in said driver includes a circuit for adjusting a voltage of power supplied.

18. The motor controller of claim 1, wherein the power receiving section in said detector includes a voltage-regulating circuit for stabilizing a voltage received.

19. The motor controller of claim 1, wherein said driver includes a terminal to which a plurality of the power cables can be coupled; and said detector includes a terminal to which a plurality of the power cables can be coupled.

20. The motor controller of claim 1, wherein said detector includes a terminal to which an outer power source can be coupled.

21. The motor controller of claim 1, wherein said driver includes a cut-section of an output line from the power-supplying section and a shorting member, attached to the cut section of the output line, for coupling the output line, and said detector includes a terminal to which an outer power source can be coupled.

22. The motor controller of claim 10, wherein the control-signal-receiving circuit of said detector includes a fail-safe circuit for detecting an abnormality in a signal received, the fail-safe circuit including:

pull-up resistor R1 for being inserted between a plus end of a control power supply and a first input terminal of the control-signal-receiving circuit;

resistor R3 for being inserted between the first input terminal of the control-signal-receiving circuit and a first terminal of the signal winding of the transformer on said detector side;

resistor R4 for being inserted between a second input terminal of the control-signal-receiving circuit and a second terminal of the signal winding of the transformer on said detector side; and pull-down resistor R2 for being inserted between the second input terminal of the control-signal-receiving circuit and a minus end of the control power supply.

23. The motor controller of claim 16, wherein the control-signal-receiving circuit of said detector includes a fail-safe circuit for detecting an abnormality in a signal received, the fail-safe circuit including:

pull-up resistor R1 for being inserted between a plus end of a control power supply and a first input terminal of the control-signal-receiving circuit;

resistor R3 for being inserted between the first input terminal of the control-signal-receiving circuit and a first terminal of the signal winding of the transformer on said detector side;

resistor R4 for being inserted between a second input terminal of the control-signal-receiving circuit and a second terminal of the signal winding of the transformer on said detector side; and pull-down resistor R2 for being inserted between the second input terminal of the control-signal-receiving circuit and a minus end of the control power supply.

24. The motor controller of claim 9, wherein the control-signal-receiving circuit of said driver includes a fail-safe circuit for detecting an abnormality in a signal received, the fail-safe circuit including:

pull-up resistor R1 for being inserted between a plus end of a control power supply and a first input terminal of the motor-position-receiving circuit;

resistor R3 for being inserted between the first input terminal of the motor-position-receiving circuit and a first terminal of the signal winding of the transformer on said driver side;

resistor R4 for being inserted between a second input terminal of the motor-position-receiving circuit and a second terminal of the signal winding of the transformer on said driver side; and pull-down resistor R2 for being inserted between the second input terminal of the motor-position-receiving circuit and a minus end of the control power supply.

25. The motor controller of claim 13, wherein the control-signal-receiving circuit of said driver includes a fail-safe circuit for detecting an abnormality in a signal received, the fail-safe circuit including:

pull-up resistor R1 for being inserted between a plus end of a control power supply and a first input terminal of the motor-position-receiving circuit;

resistor R3 for being inserted between the first input terminal of the motor-position-receiving circuit and a first terminal of the signal winding of the transformer on said driver side;

resistor R4 for being inserted between a second input terminal of the motor-position-receiving circuit and a second terminal of the signal winding of the transformer on said driver side; and pull-down resistor R2 for being inserted between the second input terminal of the motor-position-receiving circuit and a minus end of the control power supply.

26. The motor controller of claim 10, wherein the control-signal-receiving circuit of said driver includes a fail-safe circuit for detecting an abnormality in a signal received, the fail-safe circuit including:

pull-up resistor R1 for being inserted between a plus end of a control power supply and a first input terminal of the motor-position-receiving circuit;

resistor R3 for being inserted between the first input terminal of the motor-position-receiving circuit and a first terminal of the signal winding of the transformer on said driver side;

resistor R4 for being inserted between a second input terminal of the motor-position-receiving circuit and a second terminal of the signal winding of the transformer on said driver side; and pull-down resistor R2 for being inserted between the second input terminal of the motor-position-receiving circuit and a minus end of the control power supply.

27. The motor controller of claim 14, wherein the control-signal-receiving circuit of said driver includes a fail-safe circuit for detecting an abnormality in a signal received, the fail-safe circuit including:

pull-up resistor R1 for being inserted between a plus end of a control power supply and a first input terminal of the motor-position-receiving circuit;

resistor R3 for being inserted between the first input terminal of the motor-position-receiving circuit and a first terminal of the signal winding of the transformer on said driver side;

resistor R4 for being inserted between a second input terminal of the motor-position-receiving circuit and a second terminal of the signal winding of the transformer on said driver side; and pull-down resistor R2 for being inserted between the second input terminal of the motor-position-receiving circuit and a minus end of the control power supply.

28. The motor controller of claim 12, wherein the control-signal-receiving circuit of said detector includes a fail-safe circuit for detecting an abnormality in a signal received, the fail-safe circuit including:

pull-up resistor R1 for being inserted between a plus end of a control power supply and a first input terminal of the control-signal-receiving circuit; and pull-down resistor R2 for being inserted between a second input terminal of the control-signal-receiving circuit and a minus end of the control power supply.

29. The motor controller of claim 14, wherein the control-signal-receiving circuit of said detector includes a fail-safe circuit for detecting an abnormality in a signal received, the fail-safe circuit including:

pull-up resistor R1 for being inserted between a plus end of a control power supply and a first input terminal of the control-signal-receiving circuit; and pull-down resistor R2 for being inserted between a second input terminal of the control-signal-receiving circuit and a minus end of the control power supply.

30. The motor controller of claim 11, wherein the motor-position-receiving circuit of said driver includes a fail-safe circuit for detecting an abnormality in a signal received, the fail-safe circuit including:

pull-up resistor R1 for being inserted between a first input terminal of the motor-position-receiving circuit and a plus end of a control-DC-power-supply; and pull-down resistor R2 for being inserted between a second input terminal of the motor-position-receiving circuit and a minus end of a control power supply.

31. The motor controller of claim 12, wherein the motor-position-receiving circuit of said driver includes a fail-safe circuit for detecting an abnormality in a signal received, the fail-safe circuit including:

pull-up resistor R1 for being inserted between a first input terminal of the motor-position-receiving circuit and a plus end of a control-DC-power-supply; and pull-down resistor R2 for being inserted between a second input of the motor-position-receiving circuit and a minus end of a control power supply.

32. The motor controller of claim 15, wherein the motor-position-receiving circuit of said driver includes a fail-safe circuit for detecting an abnormality in a signal received, the fail-safe circuit including:

pull-up resistor R1 for being inserted between a first input terminal of the motor-position-receiving circuit and a plus end of a control-DC-power-supply; and pull-down resistor R2 for being inserted between a second input of the motor-position-receiving circuit and a minus end of a control power supply.

33. The motor controller of claim 16, wherein the motor-position-receiving circuit of said driver includes a fail-safe circuit for detecting an abnormality in a signal received, the fail-safe circuit including:

pull-up resistor R1 for being inserted between a first input terminal of the motor-position-receiving circuit and a plus end of a control-DC-power-supply; and pull-down resistor R2 for being inserted between a second input of the motor-position-receiving circuit and a minus end of a control power supply.

34. The motor controller of claim 22, wherein a winding polarity of the signal winding of the transformer on said driver side is set such that an ampere turn of the signal winding due to current supplied from the fail-safe circuit cancels an ampere turn of the power winding.

35. The motor controller of claim 26, wherein a winding polarity of the signal winding of the transformer on said detector side is set such that an ampere turn of the signal winding due to current supplied from the fail-safe circuit cancels an ampere turn of the power winding.

36. The motor controller of claim 22, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

37. The motor controller of claim 9, wherein said detector further includes a DC power supply, and the transformer on said detector side further includes a canceling winding in which current runs from the DC power supply, a winding polarity of the canceling winding being set such that an ampere turn of the canceling winding cancels an ampere turn of the power winding.

38. The motor controller of claim 9, wherein said driver further includes a DC power supply, and the transformer on said detector side further includes a canceling winding in which current from the DC power supply runs, a winding polarity of the canceling winding being set such that an ampere turn of the canceling winding cancels an ampere turn of the power winding.

39. The motor controller of claim 24, wherein a winding polarity of the signal winding of the transformer on said driver side is set such that an ampere turn of the signal winding due to current supplied from the fall-safe circuit cancels an ampere turn of the power winding.

40. The motor controller of claim 25, wherein a winding polarity of the signal winding of the transformer on said driver side is set such that an ampere turn of the signal winding due to current supplied from the fail-safe circuit cancels an ampere turn of the power winding.

41. The motor controller of claim 27, wherein a winding polarity of the signal winding of the transformer on said driver side is set such that an ampere turn of the signal winding due to current supplied from the fail-safe circuit cancels an ampere turn of the power winding.

42. The motor controller of claim 33, wherein a winding polarity of the signal winding of the transformer on said detector side is set such that an ampere turn of the signal winding due to current supplied from the fail-safe circuit cancels an ampere turn of the power winding.

43. The motor controller of claim 25, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

44. The motor controller of claim 26, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

45. The motor controller of claim 27, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

46. The motor controller of claim 28, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

47. The motor controller of claim 29, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

48. The motor controller of claim 31, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

49. The motor controller of claim 33, wherein the fail-safe circuit further includes:

a switching element coupled in series to the pull-up resistor R1; and a switching element coupled in series to the pull-down resistor R2, both the switching elements being turned off for inactivating the fail-safe circuit at signal transmission.

50. The motor controller of claim 15, wherein said detector further includes a DC power supply, and the transformer on said detector side further includes a canceling winding in which current runs from the DC power supply, a winding polarity of the canceling winding being set such that an ampere turn of the canceling winding cancels an ampere turn of the power winding.

51. The motor controller of claim 13, wherein said driver further includes a DC power supply, and the transformer on said detector side further includes a canceling winding in which current from the DC power supply runs, a winding polarity of the canceling winding being set such that an ampere turn of the canceling winding cancels an ampere turn of the power winding.

* * * * *

UNITED STATES PATENT AND TRADEMARK OFFICE

CERTIFICATE OF CORRECTION

PATENT NO. : 6,882,125 B2 
DATED : April 19, 2005
INVENTOR(S) : Koji Kameda et al.

It is certified that error appears in the above-identified patent and that said Letters Patent is hereby corrected as shown below:

Column 23,
Line 28, change "fall" to -- fail --.

Column 24,
Line 42, change "fall" to -- fail --.

Signed and Sealed this

Eighteenth Day of April, 2006

JON W. DUDAS
*Director of the United States Patent and Trademark Office*